(12) United States Patent
Velasco et al.

(10) Patent No.: US 9,456,236 B2
(45) Date of Patent: Sep. 27, 2016

(54) SYSTEMS, DEVICES AND METHODS FOR REDUCING SWITCHING TIME IN A VIDEO DISTRIBUTION NETWORK

(71) Applicant: Crestron Electronics, Inc., Rockleigh, NJ (US)

(72) Inventors: Adolfo Velasco, Dumont, NJ (US); Justin Kennington, New York, NY (US); Christopher Merck, Hoboken, NJ (US); Gennady Pratusevich, West Nyack, NY (US)

(73) Assignee: Crestron Electronics Inc., Rockleigh, NJ (US)

( * ) Notice: Subject to any disclaimer, the term of this patent is extended or adjusted under 35 U.S.C. 154(b) by 0 days.

(21) Appl. No.: 14/500,938

(22) Filed: Sep. 29, 2014

(65) Prior Publication Data

US 2015/0020088 A1    Jan. 15, 2015

Related U.S. Application Data

(63) Continuation-in-part of application No. 13/764,315, filed on Feb. 11, 2013.

(60) Provisional application No. 61/883,719, filed on Sep. 27, 2013.

(51) Int. Cl.
| | |
|---|---|
| *H04N 7/16* | (2011.01) |
| *H04N 7/173* | (2011.01) |
| *H04N 21/254* | (2011.01) |
| *H04N 21/434* | (2011.01) |
| *H04N 21/4363* | (2011.01) |
| *H04N 21/4367* | (2011.01) |
| *H04N 21/4402* | (2011.01) |
| *H04N 21/2343* | (2011.01) |
| *H04N 21/438* | (2011.01) |

(Continued)

(52) U.S. Cl.
CPC ...... *H04N 21/2541* (2013.01); *H04L 12/2838* (2013.01); *H04N 21/2343* (2013.01); *H04N 21/4344* (2013.01); *H04N 21/4367* (2013.01); *H04N 21/4384* (2013.01); *H04N 21/43635* (2013.01); *H04N 21/4402* (2013.01); *H04N 21/4627* (2013.01); *H04L 2012/2849* (2013.01)

(58) Field of Classification Search
USPC ................................... 725/25, 116
See application file for complete search history.

(56) References Cited

U.S. PATENT DOCUMENTS

| | | | |
|---|---|---|---|
| 5,757,414 A | 5/1998 | Thorne | |
| 7,643,731 B2 * | 1/2010 | Kobayashi | ............. H04N 5/765 345/520 |

(Continued)

OTHER PUBLICATIONS

Office Action from U.S. Appl. No. 13/764,315 dated Nov. 15, 2013.

(Continued)

*Primary Examiner* — Brian T Pendleton
*Assistant Examiner* — Alexander Gee
(74) *Attorney, Agent, or Firm* — Creston Electronics Inc.

(57) ABSTRACT

When switching sources, resolutions or refresh rates in a video distribution network, switching times are reduced by maintaining video lock and security authentication between a video switcher and a video sink. The scaler maintains video lock and security authentication by continuing to generate video timing data during switching events. The scaler also facilitates an aesthetically pleasing transition by generating image content data prior to and after the switching event.

24 Claims, 12 Drawing Sheets

(51) Int. Cl.
*H04N 21/4627* (2011.01)
*H04L 12/28* (2006.01)

(56) References Cited

U.S. PATENT DOCUMENTS

| | | | |
|---|---|---|---|
| 7,702,925 B2 | 4/2010 | Northcutt et al. | |
| 7,796,194 B2 | 9/2010 | Hall | |
| 7,893,941 B2* | 2/2011 | Day | G06F 3/1423 345/520 |
| 8,321,905 B1* | 11/2012 | Streeter | H04N 21/4384 709/231 |
| 2009/0138935 A1* | 5/2009 | Ohkita | G09G 5/006 725/134 |
| 2010/0138889 A1* | 6/2010 | Subramanian | H04N 21/4331 725/118 |
| 2011/0134330 A1 | 6/2011 | Yu et al. | |
| 2011/0150215 A1* | 6/2011 | Domingo | H04N 7/1675 380/200 |
| 2011/0176056 A1* | 7/2011 | Toba | H04N 21/4104 348/552 |
| 2012/0147267 A1* | 6/2012 | Ryan | H04N 5/06 348/521 |
| 2013/0103822 A1* | 4/2013 | Wolcott | H04L 41/12 709/224 |
| 2014/0153904 A1* | 6/2014 | Adimatyam | H04N 5/76 386/248 |

OTHER PUBLICATIONS

Response/Amendment in regard to Office Action from U.S. Appl. No. 13/764,315, dated Nov. 15, 2013, Submitted on Sep. 8, 2014.
Office Action from U.S. Appl. No. 13/764,315 dated Oct. 10, 2014.
Response/Amendment in regard to Office Action from U.S. Appl. No. 13/764,315, dated Oct. 10, 2014, Submitted on Feb. 5, 2015.
Office Action from U.S. Appl. No. 13/764,315 dated Apr. 30, 2014.
Response/Amendment in regard to Office Action from U.S. Appl. No. 13/764,315, dated Nov. 15, 2013, Submitted on Oct. 30, 2015.

* cited by examiner

SYSTEMS, DEVICES AND METHODS FOR REDUCING SWITCHING TIME IN A VIDEO DISTRIBUTION NETWORK

BACKGROUND OF THE INVENTION

1. Technical Field

The present invention relates generally to video distribution networks. More particularly, the invention relates to methods and apparatuses for distributing video protected by a digital rights management scheme.

2. Background Art

Video distribution networks are increasingly common installations in commercial and residential facilities. Components of a video distribution network are typically located throughout the facility and networked allowing video to be distributed from one or more video source to one or more video sinks. For example, a typical video distribution network in a home may comprise a multitude of video sources, such as Blu-Ray Disc Players, media servers, digital video disc (DVD) players, Digital Video Recorders (DVR), and cable boxes. These video sources may be centrally located such as in an equipment rack in a closet and distributed via a chain of switches and repeaters to various video sinks, such as television displays, computer monitors and projectors, throughout the home.

However, as the digital distribution of television, movies, and music expands, content providers are growing increasingly concerned about the simplicity with which content pirates can copy and share copyrighted material. Various digital rights management (DRM) schemes have been developed to ensure that television shows, movies and music can only be viewed or heard by authorized parties (i.e. paying customers). One DRM scheme to protect digital content as it is transmitted over cables between devices is known as High-Bandwidth Digital Content Protection (HDCP). HDCP is a specified method developed by Digital Content Protection, L.L.C. (DCP) for protecting copyrighted digital content as it travels across connection interfaces and protocols such as DisplayPort (DP), Digital Video Interface (DVI), High-Definition Multimedia Interface (HDMI). The HDMI specification defines an interface for carrying digital audiovisual content from a source such as a Blu-Ray Disc player, to a sink or display device such as a television (TV).

There are three facets to HDCP. First, there is the authentication protocol, through which a source verifies that a given sink is licensed to receive HDCP content. With the legitimacy of the sink determined, encrypted HDCP content may be transmitted between the two devices, based on shared secrets established during the authentication protocol. The use of such shared secrets prevents eavesdropping devices from utilizing the content. Finally, in the event that legitimate devices are compromised to permit unauthorized use of HDCP content, renewability allows a source to identify such compromised devices and prevent the transmission of HDCP content.

The HDCP authentication protocol is an exchange between an HDCP compliant source and an HDCP compliant sink that affirms to the source that the sink is authorized to receive HDCP content by demonstrating knowledge of a set of secret device keys by transmitting a key selection vector (KSV). Each HDCP device is provided with a unique set of these secret device keys, referred to as the Device Private Keys, from DCP. The communication exchange also provides for both the HDCP compliant source and sink to generate a shared secret value that cannot be determined by eavesdropping on that exchange. By having that shared secret information embedded into the demonstration of authorization, the shared secret can then be used as a symmetric key to encrypt HDCP content intended only for the authorized device. Thus, a communication path is established between the HDCP source and HDCP sink that only authorized devices can access.

In order for an HDCP compliant source to successfully transmit protected content to one or more HDCP compliant sinks through an HDCP compliant repeater, a more involved authentication process must first occur. To affirm the downstream sinks to the upstream sources, the HDCP repeater must pass along the KSVs of each downstream receiver to the upstream source. The HDCP source checks these KSVs against an HDCP Revocation List maintained by DCP, LLC ("HDCP blacklist") in order to determine if each of the downstream sinks are licensed to receive the protected content. If all the downstream sinks are determined to be licensed to receive the protected content, the upstream source transmits the protected content to the HDCP repeater. It is the responsibility of the HDCP repeater to then establish and periodically manage authenticated links with each of its connected HDCP receivers.

While HDCP offers the benefit of encrypted content transmission, the required authentication protocol increases the switching delay in video distribution networks. Each time a new path for video distribution is desired, the links forming those paths must be authenticated. For example, when a user desires to switch to a different video source, not only must the new video source authenticate with the repeater, but the repeater must also reauthenticate with the video sink. Increased switching times are disrupting and bothersome to users. In complex video distribution systems with multiple layers, this problem is even more amplified. Additionally, because HDCP scheme operates under the surface, most users do not realize that the increased time is the result of copy protection schemes and often unfairly attribute them to the individual components in the video distribution network.

An additional factor in the high switching delay in video distribution units, is caused by the need for processing in video distribution networks. Scalers are employed to change the resolution or refresh rate of distributed video and are common components in video distribution networks, either as separate components or integrated into other components in the network. Each time a video scaler receives audiovisual data at a new resolution, there is a delay before the scaler outputs any new video. The video scaler must load data and format before outputting scaled video. This is known as achieving video lock. During a switching event, each scaler in the distribution path must achieve video lock in succession. In complex video distribution systems with multiple layers, this delay is amplified.

Additionally, dependent on the characteristics of the display, viewers may be subjected to disrupting video artifacts or snow during switches. Manufacturers handle disrupted video in different ways. Some displays may show snow when video is disrupted. Other may display pixilated images or ghost images. Many viewers find these display responses disturbing and lead some to believe that there is a problem with their equipment when no such problem exists. Users may experience the authentication process as a delayed period with snow or disorienting video artifacts.

There is now a need for an improved switcher for use in a video distribution network.

SUMMARY OF THE INVENTION

It is to be understood that both the general and detailed descriptions that follow are exemplary and explanatory only and are not restrictive of the invention.

Disclosure of Invention

Principles of the invention provide a device and method for reducing the actual and perceived switching time of a video distribution network by outputting a continuous stream of audiovisual data including a repeated frame of image content data on a downstream connection of a switcher device. For example, in a first aspect of the invention, a switcher device comprises at least two input boards, a multiplexer and an output board. Each of the at least two input boards are configured for receiving audiovisual data from a video source. The multiplexer is communicatively coupled between the at least two input boards and a transmitter board and configured for dynamically routing audiovisual data from the at least input boards to the transmitter board. The output board is configured for transmitting audiovisual data comprising a repeated frame of video to a video sink.

According to a second aspect of the invention, a switcher device comprises at least two input boards, a multiplexer board and an output board. Each of the at least two input boards is configured for receiving audiovisual data from a video source. The multiplexer board comprises a multiplexer communicatively coupled between the at least two input boards and an output board and configured for dynamically routing audiovisual data from the at least two input boards to the output board and a processing unit in communication with the multiplexer and the output board and configured for transmitting a switch signal to the multiplexer and a prepare signal to the transmitter board prior to a switching event. The output board is configured for transmitting audiovisual data to a video sink and comprises a receiver configured for receiving audiovisual data routed from the multiplexer, a scaler configured for converting audiovisual data received via the multiplexer to video to a native resolution of the video sink, generating video timing data at the native resolution of the video sink during the switching event and generating image content data comprising a repeated frame of video for a period of time until achieving video lock in response to receiving the prepare signal, and a transmitter configured for encrypting and transmitting generated audiovisual data to the video sink.

According to a third aspect of the invention, an output board for a switcher device is configured for transmitting audiovisual data to a video sink. The output board comprises a receiver, a scaler and a transmitter. The receiver is configured for receiving audiovisual data. The scaler is configured for converting the audiovisual data to a native resolution of the video sink and configured for generating audiovisual data comprising a repeated frame during a switching event. The transmitter is configured for encrypting and transmitting the output of the scaler.

According to a fourth aspect of the invention, a method for reducing switching delay when switching sources in a video distribution network comprises the steps of receiving audiovisual data at a first input board from a first video sink, routing audiovisual data from the first input board to an output board, transmitting audiovisual data from the output board to a video sink, receiving a user control signal to switch to a second video source, generating video timing data at the output board during a delay between receiving audiovisual data from the first input board and receiving audiovisual data from the second input board to maintain authenticity of security protocol link between the output board and the video sink, generating image content data at the output board during a delay between receiving audiovisual data from the first input board and achieving video lock with audiovisual data from the second input board, receiving audiovisual data at a second input board from a second video sink, routing audiovisual data from the second input board to the output board, and transmitting audiovisual data from the output board to the video sink.

According to a fifth aspect of the invention, a computer program product for reducing the switching time in a video distribution network, the computer program product comprises a computer readable storage medium having computer readable code embodied therewith. The computer readable program code comprises computer readable program code configured to detect a user control signal to switch from a first video source to a second video source, transmit a prepare signal to a processing unit of an output board in response to the detection of the user control signal, detect the prepare signal, instruct a scaler to generate audiovisual data comprising image content data further comprising a repeated frame of video in response to the detection of the prepare signal, cease routing audiovisual data from a first video source to the output board, continue generating video timing data at the scaler of the output board, begin routing audiovisual data from a second video source to the input board, cease generating image content data upon achieving video lock.

The present invention seeks to overcome or at least ameliorate one or more of several problems, including but not limited to: reducing the switching delay of a video distribution network transmitting video.

BRIEF DESCRIPTION OF DRAWINGS

The accompanying figures further illustrate the present invention.

The components in the drawings are not necessarily drawn to scale, emphasis instead being placed upon clearly illustrating the principles of the present invention. In the drawings, like reference numerals designate corresponding parts throughout the several views.

Figure 1:
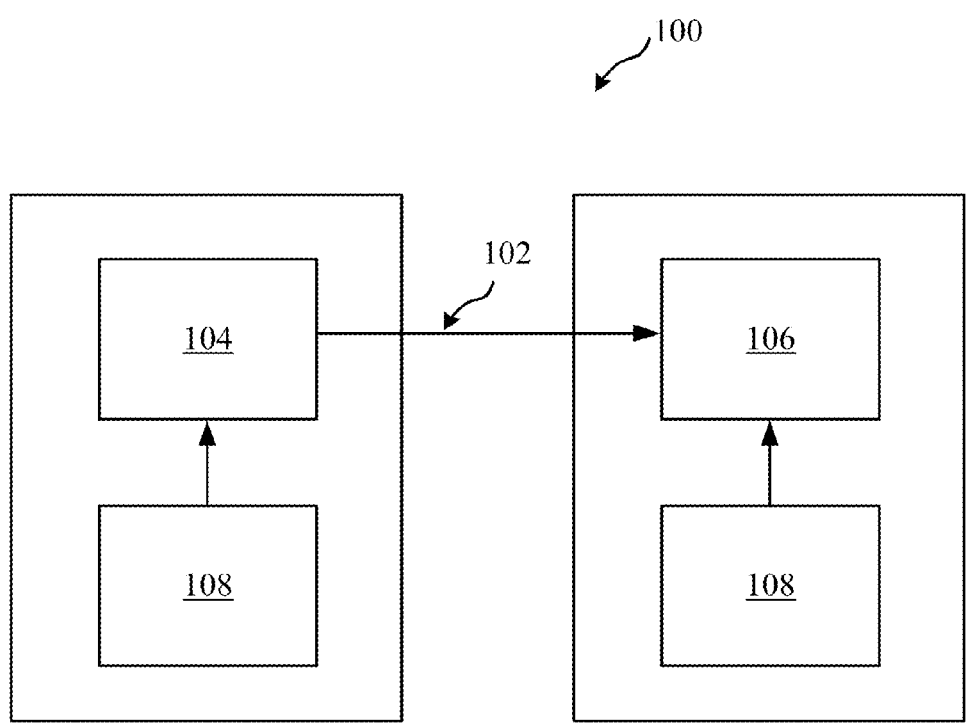

Brief Description of the Several Views of the Drawing

FIG. 1 is a block diagram of an illustrative High-Bandwidth Digital Content Protection (HDCP) system.

Figure 2:
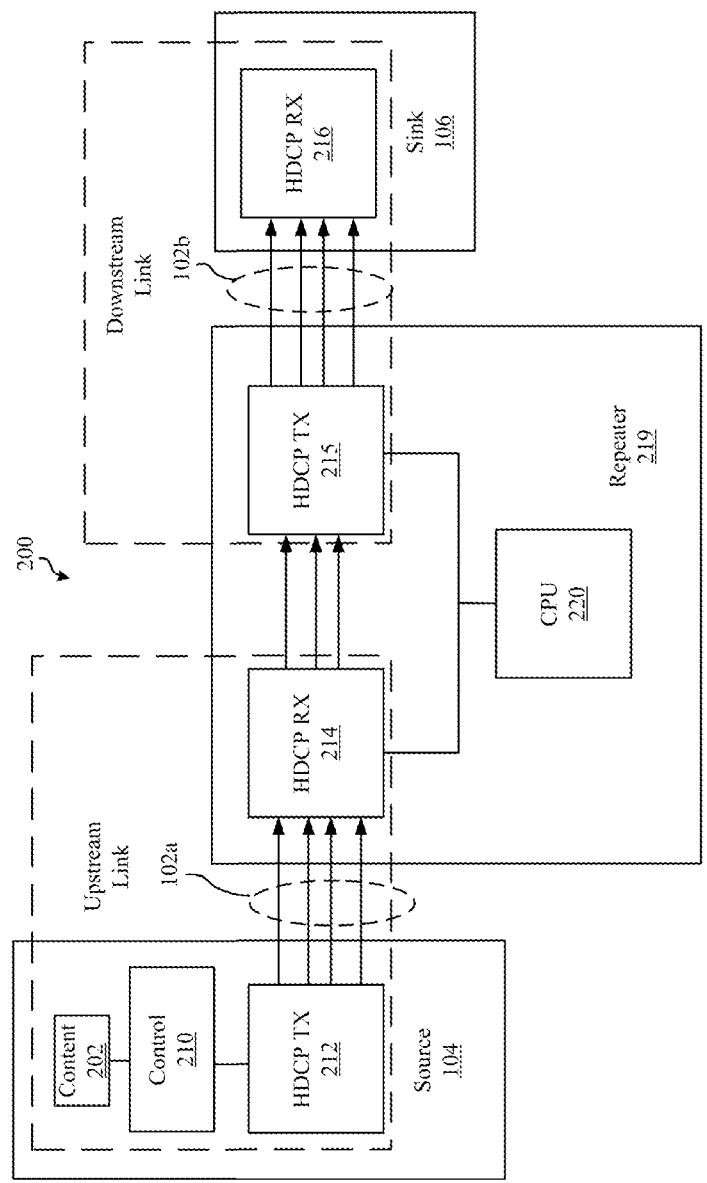

FIG. 2 is a block diagram of an illustrative HDCP system wherein two or more HDCP devices are interconnected through at least one HDCP-protected Interface.

Figure 3:
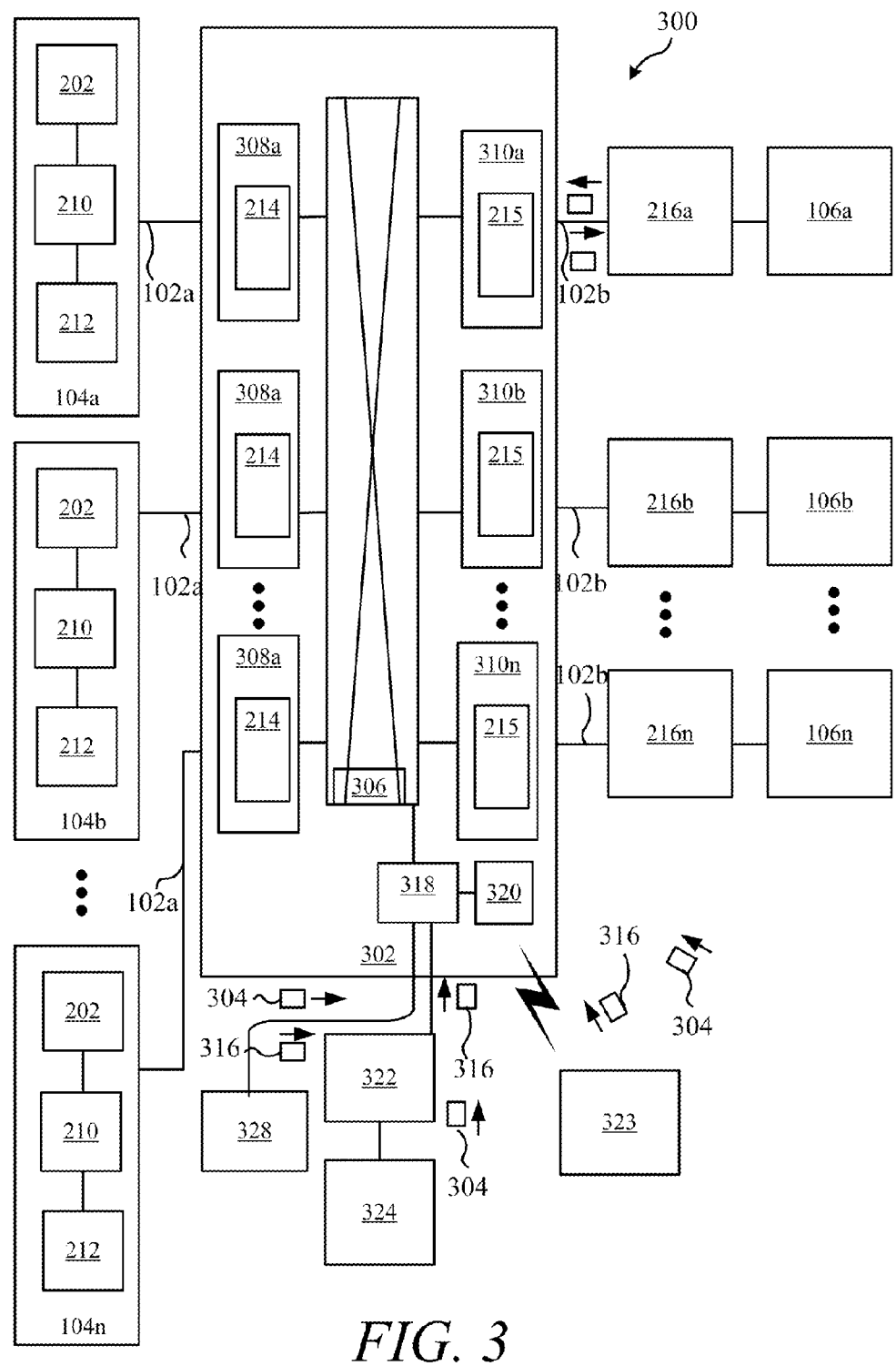

FIG. 3 is a block diagram of the inventive switcher device, according to an illustrative embodiment of the invention.

Figure 4:
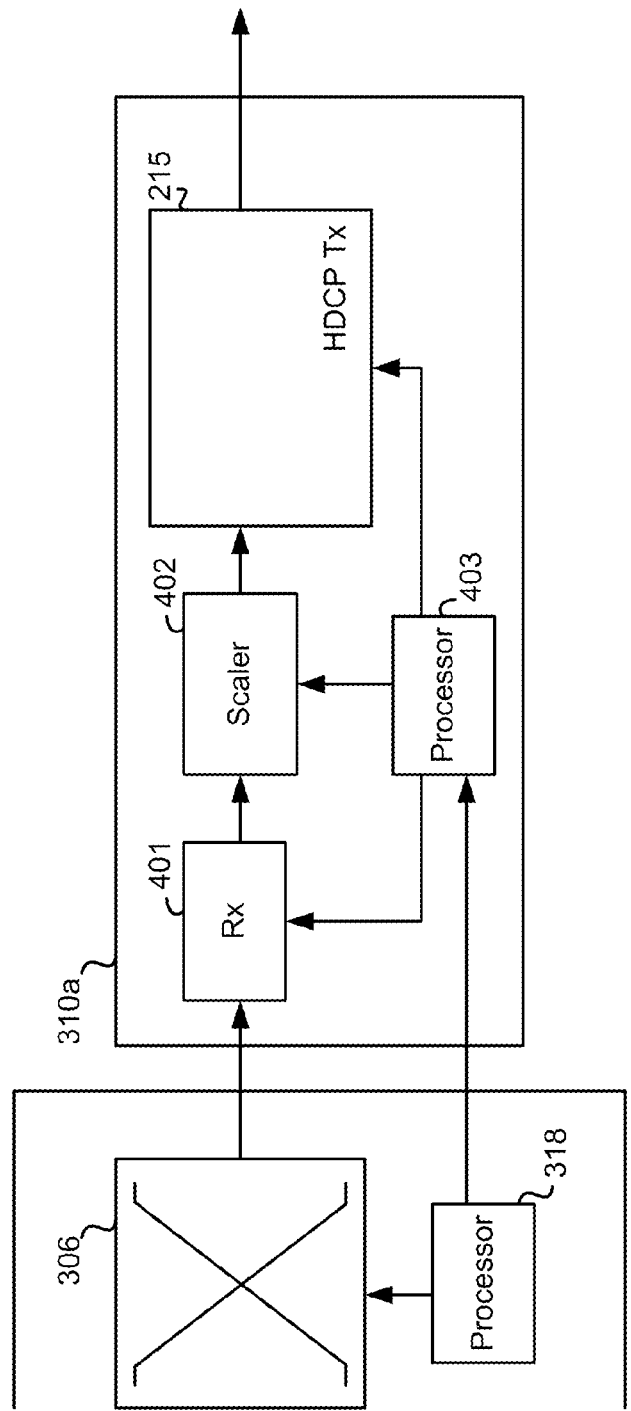

FIG. 4 is a block diagram of the switcher device shown in FIG. 3, according to an illustrative embodiment of the invention.

Figure 5:
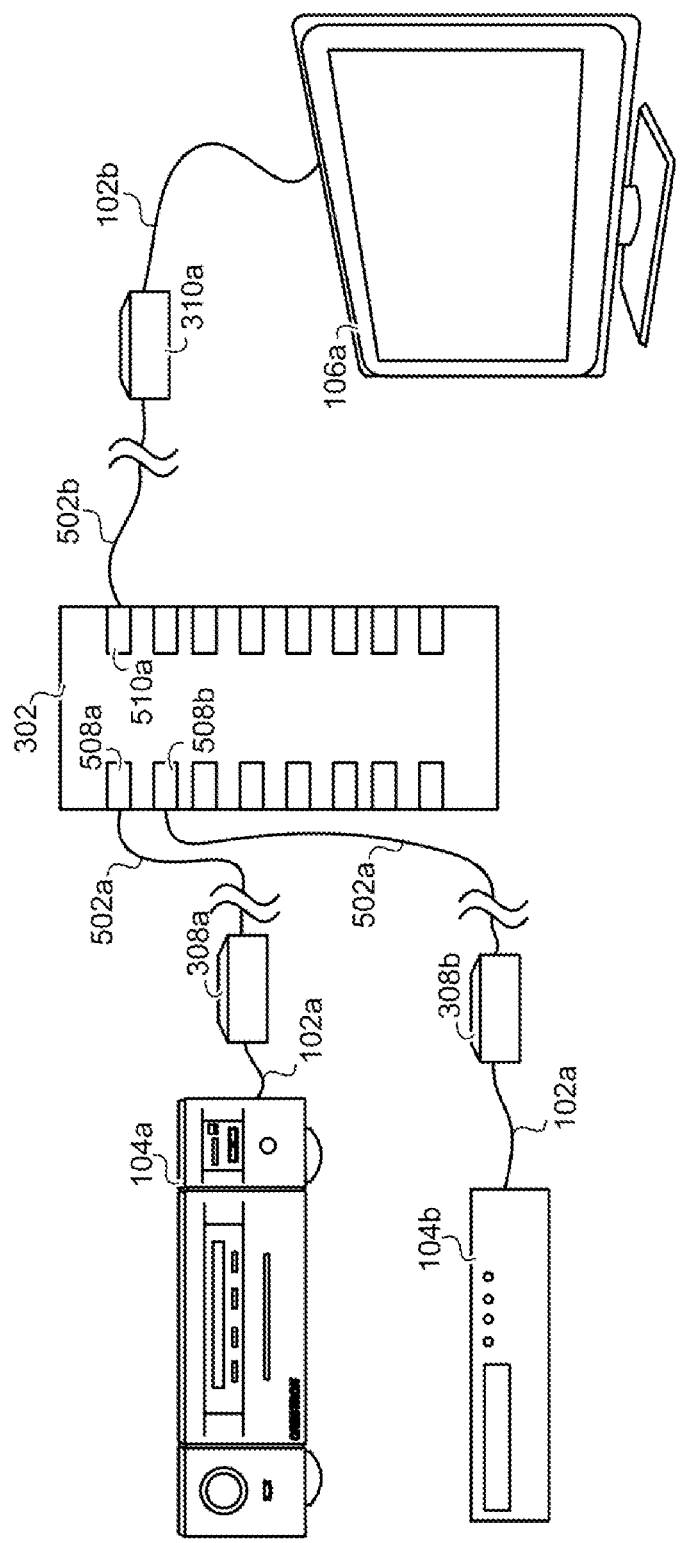

FIG. 5 shows a video distribution network, according to an illustrative embodiment of the invention.

Figure 6:
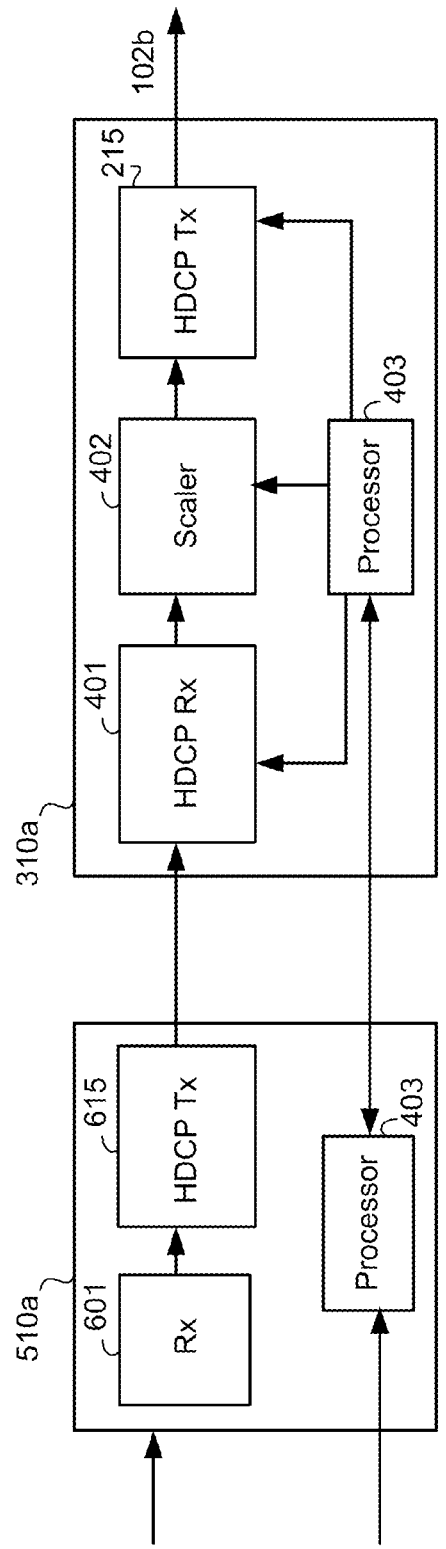

FIG. 6 is a block diagram of the output board shown in FIG. 5, according to an illustrative embodiment of the invention.

Figure 7:
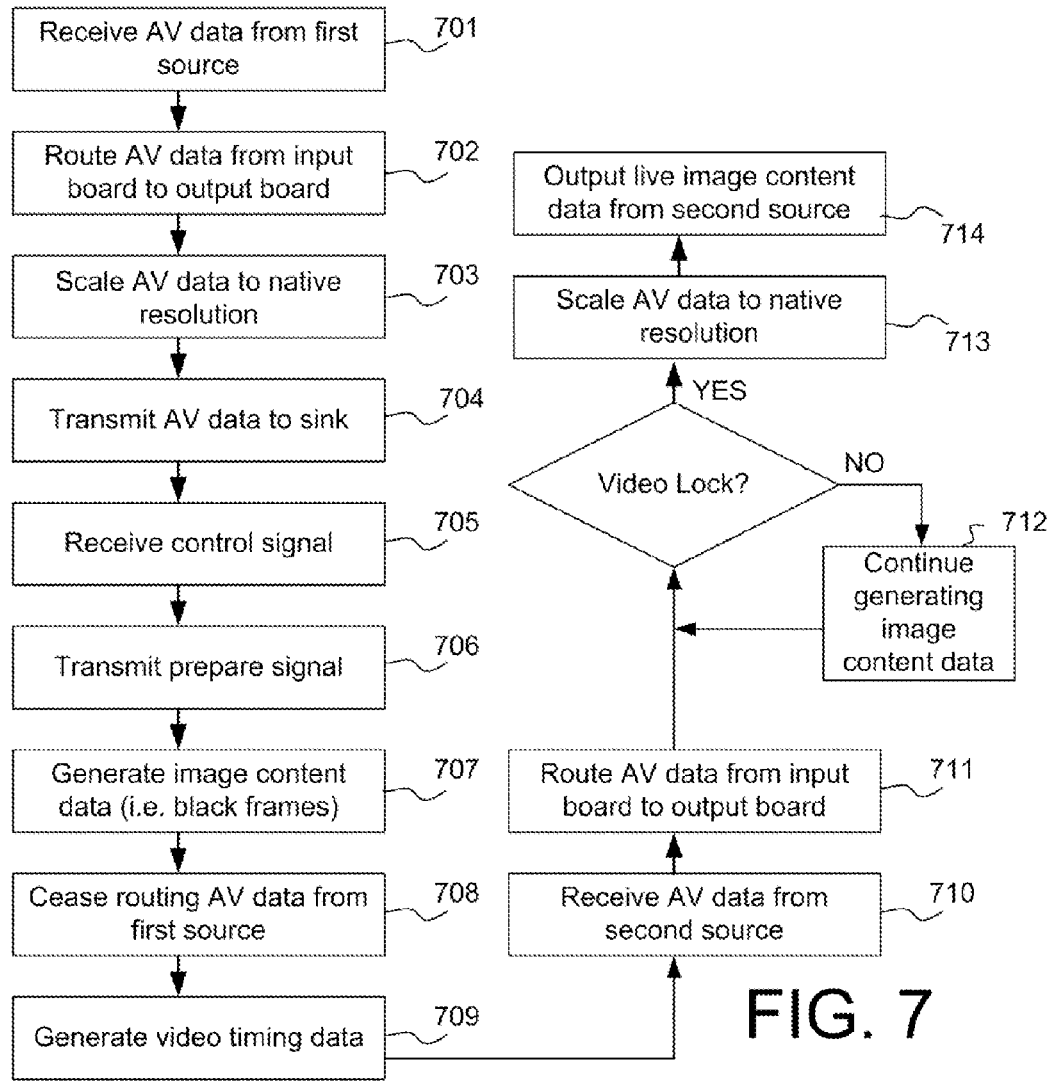

FIG. 7 is a flowchart showing illustrative steps to perform a method for reducing the switching time in a video distribution network, according to an illustrative embodiment of the invention.

Figure 8:
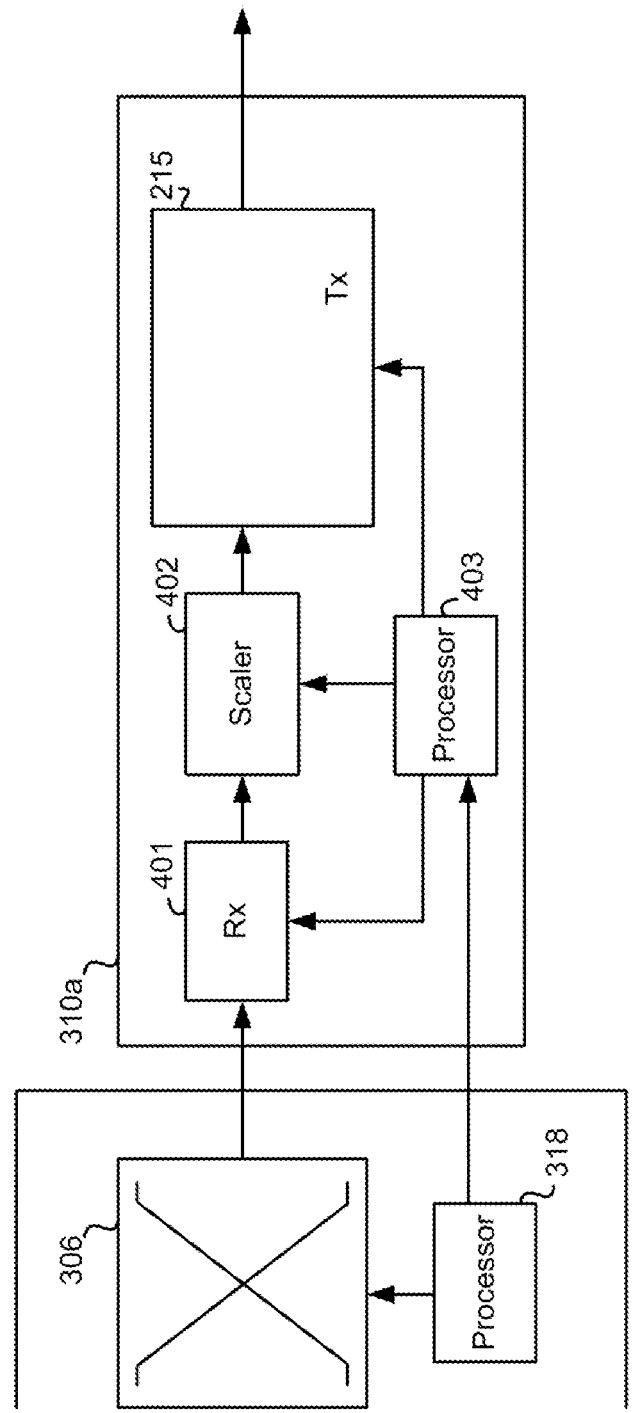

FIG. 8 is a block diagram of a switcher device and extended transmission board, according to an illustrative embodiment of the invention.

Figure 9:
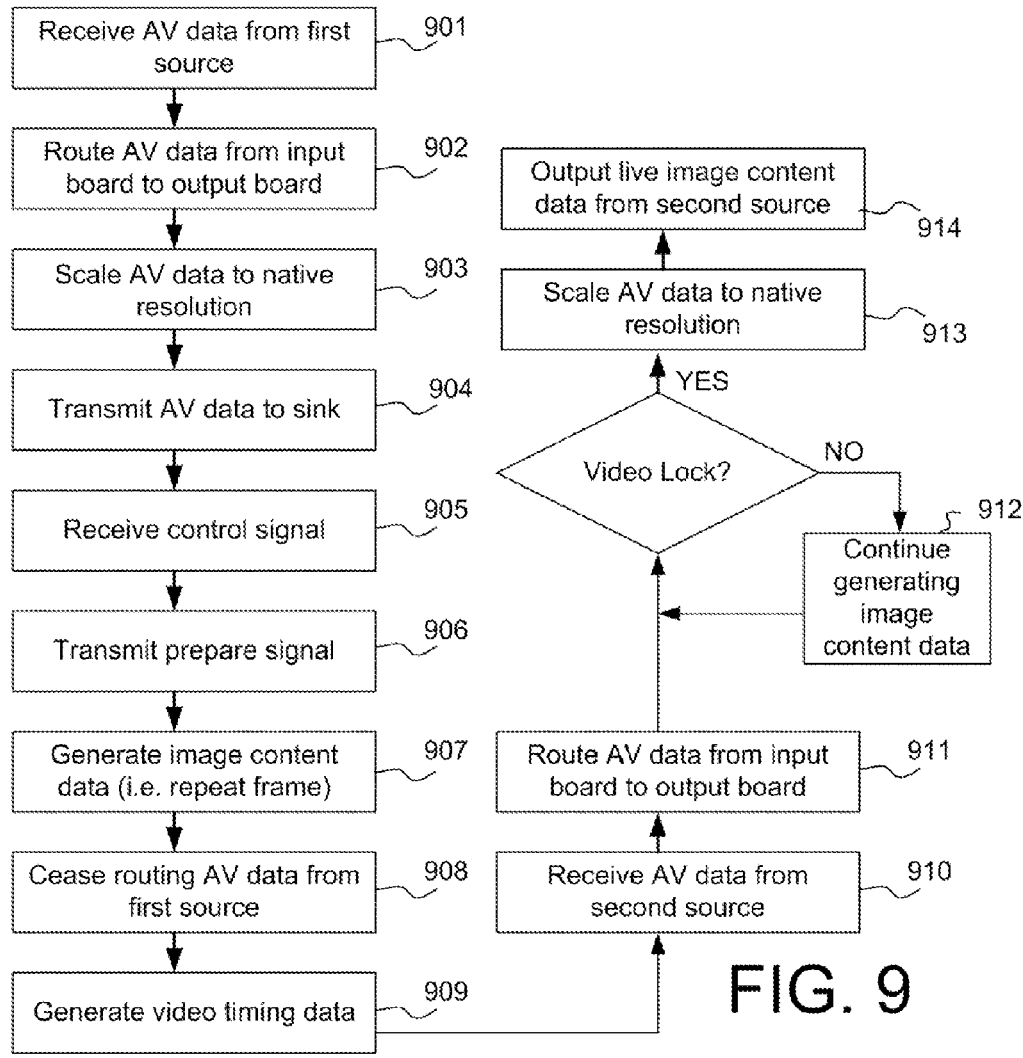

FIG. 9 is a flowchart showing illustrative steps to perform a method for reducing the switching time in a video distribution network, according to an illustrative embodiment of the invention.

Figure 10:
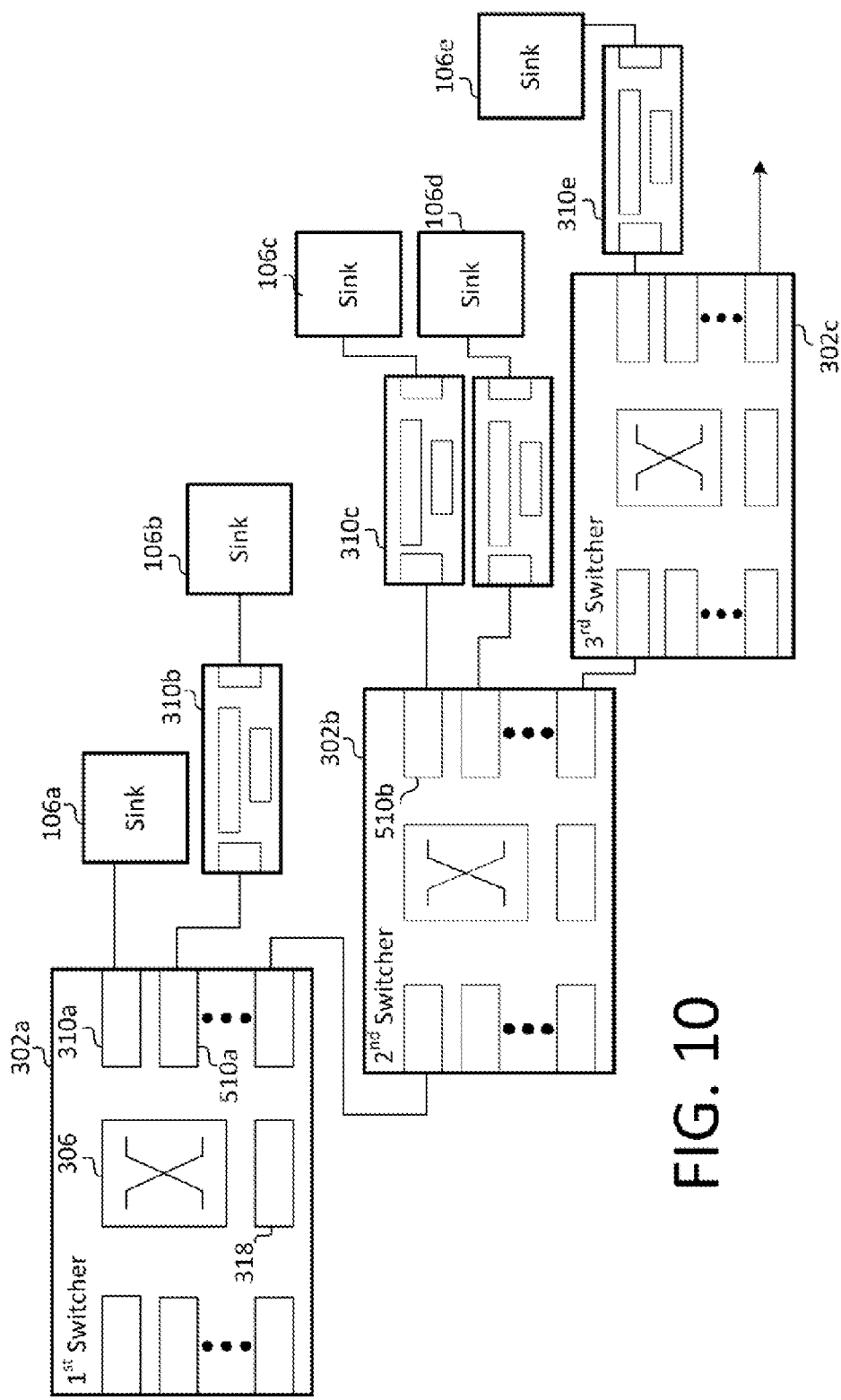

FIG. 10 is a block diagram of a video distribution system, according to an illustrative embodiment of the invention.

Figure 11:
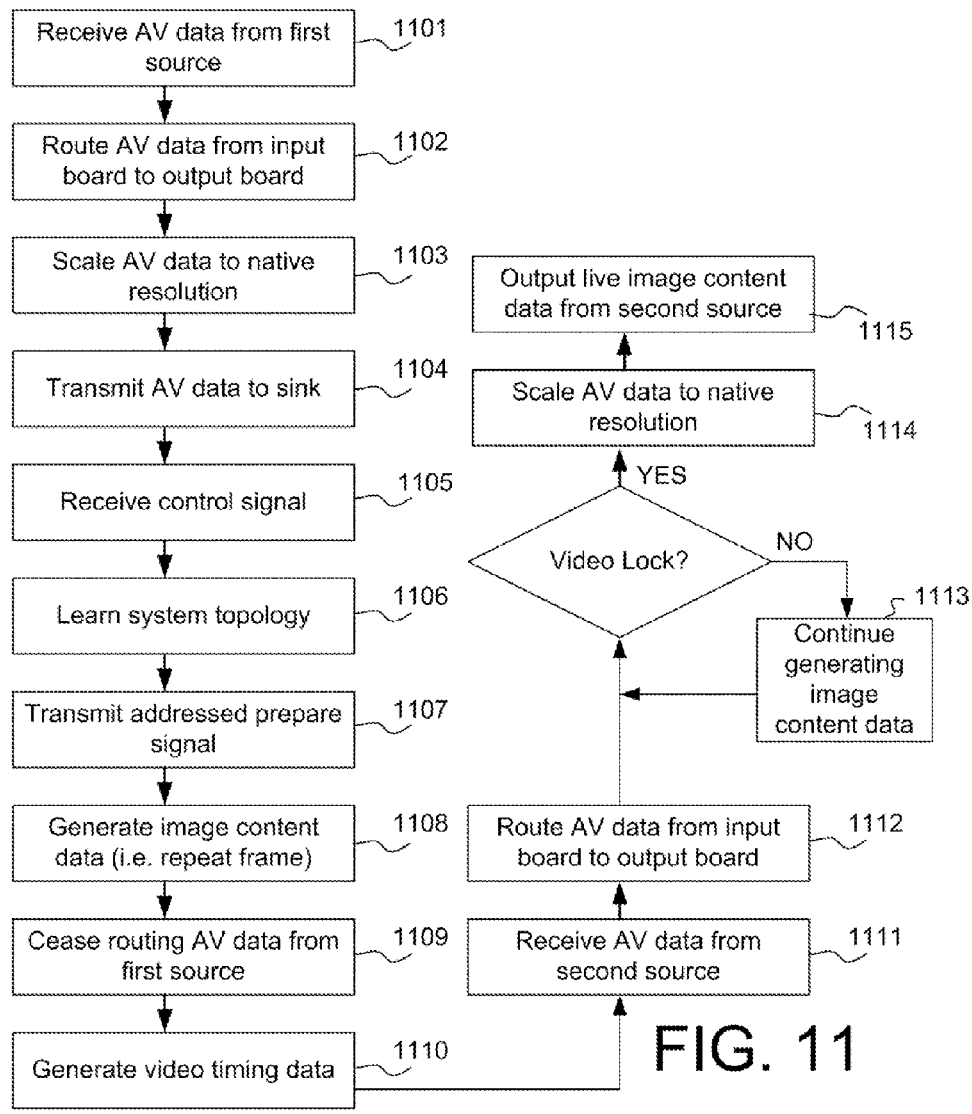

FIG. 11 is a flowchart showing illustrative steps to perform a method for reducing the switching time in a video distribution network, according to an illustrative embodiment of the invention.

Figure 12:
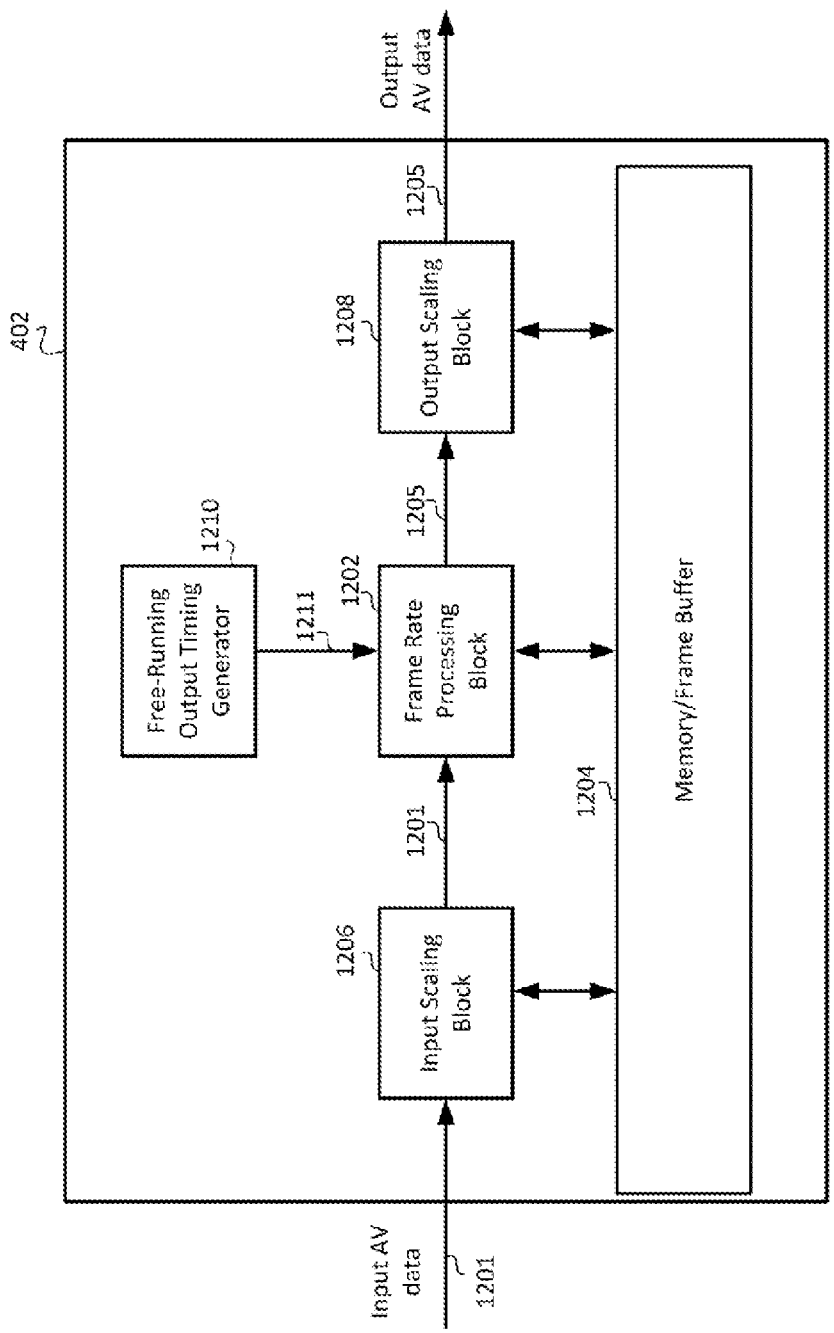

FIG. 12 is a block diagram of a scaler, according to an illustrative embodiment of the invention.

LIST OF REFERENCE NUMBERS FOR THE MAJOR ELEMENTS IN THE DRAWING

The following is a list of the major elements in the drawings in numerical order.
- 100 High Bandwidth Digital Content Protection system
- 102 collectively interface cable or link of 102a, 102b
- 104 collectively the source of 104a, 104b, . . . , 104n
- 106 collectively the sink/display of 106a, 106b, . . . , 106n
- 108 secret device keys
- 200 High Bandwidth Digital Content Protection system
- 202 HDCP content or audiovisual data
- 210 control function
- 212, 215 HDCP transmitter
- 214, 216 HDCP receiver
- 219 repeater
- 220 central processing unit
- 300 video distribution network
- 302 switcher device
- 304 control signal
- 306 multiplexer
- 308 collectively the input board of 308a, 308b, . . . , 308n
- 310 collectively the output board of 310a, 310b, . . . , 310n
- 316 user control signal
- 318 switcher processing unit
- 320 transceiver
- 322 control system
- 323 user interface device, specifically wireless/mobile device
- 324 user interface device
- 401 receiver
- 402 output scaler
- 403 output processing unit
- 502 collectively interface cable or link of 502a, 502b, . . . , 502n
- 508 collectively the extended reception board of 508a, 508b, . . . , 508n
- 510 collectively the extended transmission board of 510a, . . . , 510n
- 601 receiver
- 615 HDCP transmitter
- 701 (step of) receiving audiovisual data at a first input board via an HDCP link
- 702 (step of) routing audiovisual data from the first input board to an output board
- 703 (step of) scaling the audiovisual data to a native resolution of a video sink
- 704 (step of) transmitting audiovisual data to the video sink via an HDCP link
- 705 (step of) receiving a control signal to switch from first output board to second output board
- 706 (step of) transmitting a prepare signal to the output board
- 707 (step of) generating image content data during switching delay
- 708 (step of) ceasing routing audiovisual data from the first input board
- 709 (step of) generating video timing data during switching delay
- 710 (step of) receiving data at a second input board via an HDCP link
- 711 (step of) routing audiovisual data from the second input board to an output board
- 712 (step of) continuing to generate image content data after switching delay
- 713 (step of) scaling the audiovisual data to a native resolution of a video sink
- 714 (step of) transmitting live audiovisual data to the video sink via an HDCP link
- 901 (step of) receiving audiovisual data at a first input board
- 902 (step of) routing audiovisual data from the first input board to an output board
- 903 (step of) scaling the audiovisual data to a native resolution of a video sink
- 904 (step of) transmitting audiovisual data to the video sink
- 905 (step of) receiving a control signal to switch from first output board to second output board
- 906 (step of) transmitting a prepare signal to the output board
- 907 (step of) generating a repeating frame of image content data during switching delay
- 908 (step of) ceasing routing audiovisual data from the first input board
- 909 (step of) generating video timing data during switching delay
- 910 (step of) receiving data at a second input board
- 911 (step of) routing audiovisual data from the second input board to an output board
- 912 (step of) continuing to generate image content data after switching delay
- 913 (step of) scaling the audiovisual data to a native resolution of a video sink
- 914 (step of) transmitting live audiovisual data to the video sink
- 1101 (step of) receiving audiovisual data at a first input board
- 1102 (step of) routing audiovisual data from the first input board to an output board
- 1103 (step of) scaling the audiovisual data to a native resolution of a video sink
- 1104 (step of) transmitting audiovisual data to the video sink
- 1105 (step of) receiving a control signal to switch from first output board to second output board
- 1106 (step of) learning network topology
- 1107 (step of) transmitting an addressed prepare signal to the output board
- 1108 (step of) generating a repeating frame of image content data during switching delay
- 1109 (step of) ceasing routing audiovisual data from the first input board
- 1110 (step of) generating video timing data during switching delay
- 1111 (step of) receiving data at a second input board
- 1112 (step of) routing audiovisual data from the second input board to an output board

1113 (step of) continuing to generate image content data after switching delay

1114 (step of) scaling the audiovisual data to a native resolution of a video sink

1115 (step of) transmitting live audiovisual data to the video sink

1201 input audiovisual data

1202 frame rate processing block

1204 memory

1205 output audiovisual data

1206 input scaling block

1208 output scaling block

1210 free-running output timing generator

1211 output video timing data

DETAILED DESCRIPTION OF THE INVENTION

Mode(s) for Carrying Out the Invention

Definitions

Authorized device—An HDCP device that is permitted access to HDCP content. An HDCP transmitter may test if an attached HDCP receiver is an authorized device by successfully completing the first and, when applicable, second part of the authentication protocol. If the authentication protocol successfully results in establishing authentication, then the other device is considered by the HDCP transmitter to be an authorized device.

Downstream—Term used as an adjective to refer to being towards the sink/display of the HDCP content stream.

DVI—Short for Digital Video (or Visual) Interface, a digital interface standard created by the Digital Display Working Group (DDWG) to accommodate both analog and digital monitors.

HDCP—short for High-Bandwidth Digital Content Protection, a specified method developed by Digital Content Protection, L.L.C. (DCP) for protecting copyrighted digital content as it travels across connection interfaces and protocols such as DisplayPort (DP), Digital Video Interface (DVI), High-Definition Multimedia Interface (HDMI).

HDCP content—consists of audiovisual content that is protected by the HDCP system. HDCP content includes the audiovisual content in encrypted form as it is transferred from an HDCP transmitter to an HDCP receiver over an HDCP-protected Interface.

HDCP device—Any device that contains one or more HDCP-protected interface ports and is designed in adherence to HDCP.

HDCP Encryption—The encryption technology of HDCP when applied to the protection of HDCP content in an HDCP system.

HDCP-protected Interface—An interface for which HDCP applies.

HDCP-protected Interface Port—A connection point on an HDCP Device that supports an HDCP-protected Interface.

HDCP receiver—An HDCP device that can receive and decrypt HDCP content through one or more of its HDCP-protected interface ports.

HDCP repeater—An HDCP device that can receive and decrypt HDCP content through one or more of its HDCP-protected interface ports, and can also re-encrypt and emit the HDCP content through one or more of its HDCP-protected interface ports. An HDCP repeater may also be referred to as either an HDCP receiver or an HDCP transmitter when referring to either the upstream side or the downstream side, respectively.

HDCP transmitter—An HDCP device that can encrypt and emit HDCP content through one or more of its HDCP-protected interface ports.

HDMI—Short for High-Definition Multimedia Interface, an industry-supported, uncompressed, all-digital audio/video interface.

Upstream—Term used as an adjective to refer to being towards the source of the HDCP content stream. The antonym of "downstream," defined above.

FIGS. 1 and 2 illustrate examples of High-Bandwidth Digital Content Protection (HDCP) systems 100, 200. Referring to FIG. 1, the HDCP system 100 encrypts the digital content transmission between a video source 104 (set-top box, computer, DVD, etc.) and a sink or display 106 (Liquid Crystal Display, television, etc.) via an interface 102 such as a Digital Video Interface (DVI), a High-Definition Multimedia Interface (HDMI), and a DisplayPort interface.

FIG. 2 illustrates an HDCP system 200 wherein two or more HDCP devices 104, 106 are interconnected through an HDCP repeater and two HDCP-protected Interfaces 102a, 102b (collectively 102). Each point-to-point HDCP link involves one HDCP transmitter 212, and one HDCP receiver 214. As such, the HDCP repeater 219 must decrypt the HDCP content at the HDCP receiver 216 on each of its inputs. The repeater 219 must then re-encrypt the data with an HDCP transmitter 215 on each of its outputs. The repeater 219 must inform the upstream device of its downstream connection, but it is the repeater's 219 responsibility to maintain those connections. The audiovisual content protected by HDCP, HDCP content 202, flows from an upstream content control function 210 into the HDCP system 200 at the most upstream transmitter 212. From there, the HDCP content 202, encrypted by the HDCP system 200, flows through a tree-shaped topology of HDCP receivers 214 over HDCP-protected Interfaces 102. Before sending data, the each transmitter 212, 215 checks that the HDCP receivers 214, 216 are authorized to receive the HDCP content 202. If so, the transmitter 212 encrypts the HDCP content 202 to prevent eavesdropping as it flows to the receiver 216. A central processing unit 220 includes firmware to process the data 202 and other information and control.

Device manufacturers typically buy HDCP chips from a DCP-licensed silicon vendor. These chips usually also provides Transition Minimized Differential Signaling (TMDS) encoders or decoders and other HDMI-specific features. Every transmitter 212 will have at least one HDCP transmitter chip and every receiver 216 will have at least one HDCP receiver chip. The HDCP transmitters 212, and receivers 216 frequently require a microprocessor to implement the authentication state machines. Transmitters 212, 215 are HDMI transmitters.

The Authentication and Encryption Protocols

HDCP authentication consists of three parts:

Part One: The source 104 authenticates with the sink/display 106 connected to its output. If successful, encryption is enabled and audiovisual (A/V) content transmission begins.

Part Two: This part is used if the downstream device is a repeater 219. The repeater 219 authenticates with the devices connected to its output(s) and passes the HDCP tree topology information up to the source 104. The source 104 is the root and sinks/display 106 are the leaves, while repeaters 219 make up the branches of the tree.

Part Three: The source 104 performs periodic checks with the sink/display 106 to ensure that encryption is in sync. As mentioned above, it is the repeater's responsibility to maintain its downstream connections. If any part of authentication fails or any revoked devices are found in the HDCP tree, the transmitter 212 must stop sending protected content and authentication starts over at Part One.

Authentication Part One

Part One of authentication is a key exchange protocol. The transmitter 212 and receiver 216 calculate a common secret session key 108 to be used for encryption. If they cannot come up with the same key value, authentication fails and the receiver 216 will not be able to decrypt the content 202. The session key is derived from each device's private key according to the following protocol:

First the transmitter 212 generates a random number "An" and sends it to the receiver 216. This value will be used later in the protocol. The devices 104, 106 then exchange KSVs. The receiver 216 also sends its REPEATER bit, a flag that indicates whether or not it is part of a repeater. Now each device 104, 106 has the other device's Key Selection Vector (KSV). Each device 104, 106 uses the other device's Key Selection Vector to select twenty of its own keys. The forty bits in the KSV correspond to the indexes of each of the forty private keys. For every set bit in the received KSV, the local private key at that index is selected. All KSVs have twenty set bits, so twenty keys are selected. The devices 104, 106 then each add up their selected keys to come up with the sums Km and Km', for the transmitter and receiver, respectively 212, 216. For authentication to succeed, Km and Km' must match. Each device 104, 106 tells the other which of its own unique, secret keys to select, and they both come up with the same sum. That may seem counter-intuitive, but it is the aforementioned mathematical relationship between the keys and the KSVs that accounts for this behavior. The source 104 must determine whether Km and Km' match. However, they are secret values, so they cannot be transmitted over the interface cable 102 for the DDC. Each device 104,106 feeds Km (or Km'), the random number "An", and the REPEATER bit into their respective HDCP cipher engines in order for the transmitter 212 to verify that the values match without sending them across the cable 213 for everyone to see. The resulting data stream is split into three values:

R0/R0': This return value may be shared between the devices 104, 106 and is used to verify that authentication was successful.

Ks/Ks': This value is kept private and is used as the encryption session key for the HDCP cipher.

M0/M: This value is also kept private and is used in Part Two of authentication (if the downstream device is a repeater 219).

The receiver sends R0' to the transmitter 212, which compares it against its' own R0 value. If they match, that proves that the sums Km and Km' matched, and authentication is successful. Furthermore, the session keys Ks and K match, so the receiver 214 will be able to decrypt the content encrypted by the transmitter. If Part One of authentication was successful, the transmitter 212 may begin sending encrypted content 202. If the downstream device is a repeater 219, the repeater 219 must authenticate with its own downstream device according to the same protocol. The transmitter 212 then starts a 5-second timer to allow for the repeater 219 to perform Part Two of authentication. If Part Two fails or times out, authentication fails and the transmitter 212 must stop transmitting the protected content 202.

Authentication Part Two

Part Two of authentication only occurs if the downstream device is a repeater 219. The purpose of Part Two is to inform the source 104 of all downstream devices and the HDCP tree depth. The source 104 uses this information to ensure that the tree topology maximums have not been exceeded and to ensure that none of the downstream devices have been revoked by DCP. The repeater 219 first assembles a list of the KSVs of all downstream devices, as well as the device count and the tree depth. The repeater 219 then passes this information up to the source 104. To ensure that this information hasn't been tampered with during transmission, each device takes this list, appends its secret value M0/M0' from Part One, and calculates a SHA-1 hash of the whole thing. The transmitter 212 reads the hash result from the receiver 214 and compares it against its own. If they match, Part Two of authentication is successful.

Authentication Part Three

All HDCP devices are considered authenticated after successful completion of Authentication Parts One and Two. Part Three is simply a link integrity check to ensure that encryption is in sync between all transmitter/receiver pairs 212, 214, 215, 216 in the tree. To support link integrity checks, the return values Ri and Ri' roll over to a new value every 128 frames. Recall that the initial Ri values R0 and R0' were generated during Part One of authentication. Every two seconds, the transmitter 212 compares the receiver's 216 Ri' value against its own Ri value to see if they match. If they don't, encryption is out of sync and the receiver 216 cannot correctly decrypt the content 202. The user will see a scrambled or "snowy" image on the screen. In this case the transmitter 212 must restart authentication from the beginning.

Inventive Embodiments

The three part authentication process increases switching delay when switching sources in a video distribution network. Switching delay is the delay between switching an aspect of incoming audiovisual data to a video sink, such as audiovisual data source, audiovisual data resolution and audiovisual data refresh rate, and the incoming audiovisual data being displayed on the video sink. Not only must devices authenticate the HDCP link before video transmission, each time an upstream HDCP link is switched, downstream HDCP links may be affected as well because audiovisual data transmission to downstream links is interrupted. Each time video transmission is interrupted between an HDCP transmitter and an HDCP receiver, the HDCP link fails Part Three of the authentication process and the authentication process must be restarted from Part One. This includes downstream connections that were previously authenticated with each other.

For example, in a video distribution network comprising a first HDCP-compliant video source and a second HDCP compliant video source connected to an HDCP compliant video sink via an HDCP compliant video switcher, when the video source transmitting HDCP content to the video sink is switched from the first video source to the second video source, not only must the second video source authenticate with the video switcher, but the downstream link between the video source and the video switcher must also be reauthenticated due to the disruption in video transmission. This despite the fact that the HDCP link between the video source and the video switcher was already authenticated. This issue becomes increasingly burdensome in expansive video distribution networks with many layers (i.e. a large tree topology).

Additionally, when video transmission is interrupted between an HDCP transmitter and an HDCP receiver due to upstream switching and HDCP authentication, any downstream video scalers must lock back on the incoming audiovisual data before outputting any scaled audiovisual data. This introduces delay in addition to the delay introduced by the HDCP authentication process. For example, each time video transmission to a sink is interrupted, video scaler internal to the sink will take anywhere between two and ten seconds to lock onto the incoming audiovisual data again. Those skilled in the art will recognize that scaler operation is unpredictable and varies due to hardware and firmware specification. Often, video scalers included in video sinks are not optimized for reducing switching delay. Also unpredictable is video sink response while embedded video scalers achieve video lock. Presented with interrupted video, the video sink may display snow, pixilated images, video artifacts or a blank screen while internal scaler achieves video lock dependent on video sink manufacturer.

Because the HDCP authentication process operates in the background, often unknown to the user, long switching delays are unfairly blamed on video distribution components. Users may experience the authentication process as a delayed period with snow or disorienting video artifacts. This could result in undeserved user dissatisfaction with the manufacturer of the components in the video distribution network.

As will be explained below, the present invention discloses systems, apparatuses and methods for reducing the switching time in a video distribution network. The present invention discloses maintaining authentication of downstream link during a switching discontinuity, minimizing the interruption of video transmission resulting from switching events. By outputting continuous video timing data to a sink over a downstream HDCP link, even during switching discontinuities, the downstream HDCP link satisfies the maintenance check in step three of HDCP authentication. Accordingly, steps one and two of the HDCP authentication protocol need not be repeated. Additionally, as a result of maintaining the authentication of the HDCP link by outputting continuous video timing data during switching discontinuities, video scalers downstream of the HDCP link (i.e. internal video sink scalers) will not lose video lock with the incoming video stream thereby reducing delay times further. Finally, by outputting black frames of image data, the content displayed during switching events is controlled.

FIG. 3 is a block diagram of an inventive switcher device configured for reducing switching time in a video distribution network. The video distribution network 300 is an HDCP system and includes at least one source 104$a$, 104$b$, . . . , 104$n$ (collectively 104) and at least one sink or display 106$a$, 106$b$, . . . , 106$n$ (collectively 106). At least two sources 104 include an HDCP transmitter 212, such as an HDMI transmitter, configured to transmit audiovisual data comprising video timing data and image content data to the at least one sink 106. Each source 104 further includes a graphic generator (not shown) to generate a graphic or image. The HDCP transmitter 212 receives the HDCP content 202 from an upstream content control function 210.

At least one sink includes an HDCP receiver, such as an HDMI receiver. The source 104 determines via the authentication process what content can be viewed, recorded, and shared based on sinks/displays 106 that support HDCP and sinks/displays 106 that does not support HDCP. The output of the source 104 is connected to an input board 308 for a switcher device 302 through their HDCP-protected interfaces 304 and the switcher device 302 serves as an HDCP repeater for HDCP compliant content. An output board 310 for the switcher device 302 is connected to the input of the sink/display 106 via another interface 102$b$. The interface 102$a$, 102$b$ for the input board and the output board of the switcher device 302 may be an HDMI cable that carries a variety of signals such as one or more Transition Minimized Differential Signaling (TDMS) data signals, Digital Display Channel (DDC), Hot Plug Detect (HPD), and RxSense. As will be described later, the interface 102$a$, 102$b$ for the input board and output board of the switcher device 302 may also be a combination of one or more shielded twisted pairs (STP) and one or more unshielded twisted pairs (UTP), such as DigitalMedia (DM) cable available from Crestron Electronics, Inc. of Rockleigh, N.J.

When an HDCP source 104 (more specifically source 104$a$) detects an RxSense signal from an HDCP compliant sink/display 106 (more specifically sink/display 106$a$), the source 104$a$ will transmit HDCP content 202 to the sink/display 106$a$ after the authentication process is successful.

The audiovisual data 202 is encoded into three data channels. These channels and a TMDS clock are carried over four differential pairs from the source 104 to the sink/display 106. The DDC is a communications interface similar to I2C. This interface provides two-way communication in a master-slave relationship. The upstream device 104 is the DDC master and the downstream device 106 is the DDC slave. The HDCP receiver indicates its presence to the HDCP transmitter with the HPD signal. The HDCP transmitter 212 is the HDCP Device most upstream, and receives the HDCP content 202 from an upstream content control function 210.

The switcher device 302, functioning as an HDCP repeater, is a fully modular and expandable matrix switcher offering low-latency digital video and audio switching, and HD lossless multi-room signal distribution, for all types of A/V sources. The switcher device 302 may be a Crestron Digital Media Switcher available from Crestron Electronics, Inc. of Rockleigh, N.J.

The Crestron Digital Media Switcher is field-configurable to handle, but not limited to, eight, sixteen, and thirty-two audiovisual sources of virtually any type via input boards. The outputs are also field-configurable to provide, but not limited to, eight, sixteen, and thirty-two room outputs and/or HDMI outputs in a single chassis. The chassis comprises slots for the insertion of input and output boards. As will be described later, the input boards and output boards may be input boards and output boards, respectively, of the switcher device 302. Additionally, the input boards and output boards may operate external of the chassis of the Digital Media Switcher and be coupled to the Digital Media Switcher via intermediate cards inserted into slots in the chassis.

The switcher device 302 includes a multiplexer 306 coupled in-between the at least one input board 308$a$, 308$b$, 308$n$ (collectively 308) and at least one output board 310$a$, 310$b$, 310$n$ (collectively 310). The multiplexer 306 may be, but is not limited to, a mechanical switch, electrically operated switch, solid state relay, latching relay, reed relay, Single Pole Single Throw (SPST) relay, Single Pole Double Throw (SPDT) relay, Double Pole Single Throw (DPST) relay, and Double Pole Double Throw (DPDT) relay.

The multiplexer 306 transmits an audiovisual data signal 202 from one of the at least two input boards 308 to a first output board 310$a$. The multiplexer 306 dynamically switches between the first input board 308$a$ and at least a second input board 308$b$ based on a user control signal 316 that selects either the first video source 104$a$ or second video source 104$b$ to be displayed on the video sink 106$a$. The output board 310 is coupled to the at least one sink/display 106 via an interface cable 102b. The interface cable 102b may be an HDMI cable. The switcher 302 further includes a processing unit 318 coupled to the multiplexer 306. The processing unit 318 includes at least one transceiver 320 for bidirectional communications with an end user device (e.g. 324, 326), in part, to receive the user control signal 316. The end user device 324, 326 transmits the user control signal 316 from a touch panel display 324 via a control system 322. An end user may also transmit the user control signal 316 from a wireless device 326. Software tools 328 may be loaded onto the wireless device and/or touch panel 324 to assist the end user in selecting a desired source 104 and the sink 106. In response to the user selecting the desired source 104 for the sink 106, the end user device transmits the user control signal 316 to the switcher device 302.

Upon the user selecting the desired source 104 for the at least one desired display 106, the source 104 will authenticate with the switcher device 302 as described above. The switcher device 302 will authenticate with the at least one desired downstream sinks 106 as described above. Once the authentication is complete, the source 104 will transmit the HDCP content (i.e. HDCP protected audiovisual data) via the HDCP link between the source and the repeater. This HDCP link comprises the HDCP transmitter 212 of the source, an HDCP interface, and an HDCP receiver 214 of the first input board 308a. The HDCP receiver of the input board 308a receives the HDCP content and provides the audiovisual data unencrypted to the multiplexer 306. The multiplexer 306, dependent on the user control signal 316 routes the unencrypted audiovisual data to the desired output board 310. The output board 310 processes and encrypts the audiovisual data and then transmits the HDCP content to the desired sink 106 over an HDCP link between the output board 310 and the video sink 106. The HDCP link between the output board 310 and the video sink 106 comprises an HDCP transmitter 215 of the output board, HDCP interface and HDCP receiver of the video sink.

The multiplexer 306 is configured to dynamically route the audiovisual data according to the user control signal received at the processing unit 318. For example, a user viewing content from a first source 104a, such as a cable tuner, may desire to switch to a second source 104b, such as a Blu-ray disc player. When the multiplexer 306 switches from routing audiovisual data from the first source to routing audiovisual data from the second source 104b, the output board 310 experiences a switching delay as a result of the delay caused by upstream HDCP authentication and multiplexer 306 operation. A similar switching discontinuity may also result from a change in resolution or change in refresh rate of the received audiovisual data.

The output board 310 of the inventive switcher device 302 is configured to continuously output audiovisual data including video timing data and image content data during switching discontinuities such that the HDCP link between the output board 310 and the video sink 106 remains authenticated during the switch and an aesthetically pleasing display is shown during said switch. For example, the output board 310 may output black frames of audiovisual data during switching discontinuities. Switching delay in the video distribution network 300 is minimized by maintaining the authentication of the HDCP link by continuously outputting video timing data. Additionally, by continuously outputting video timing data to the video sink during switching discontinuities, video lock is maintained in video processing devices, such as scalers, downstream from the output board 310 (i.e. scalers internal to video sink), thereby further minimizing switching delay.

FIG. 4 is a block diagram of a portion of the switcher device 302 shown in FIG. 3. The output board 310a further comprises a receiver 401, an output scaler 402, an output processing unit 403 and an HDCP transmitter 215. The receiver 401 is configured to receive audiovisual data routed from the first input board 308a or second input board 308b via the multiplexer 306. As described below, in an embodiment of the invention, the receiver 401 is an HDCP receiver configured for receiving HDCP encrypted content.

The output scaler 402 receives the audiovisual data from the receiver 401 and is configured to convert the received audiovisual data to a native resolution of the video sink 106. The output board 310 may receive the native resolution of the video sink 106 via an EDID channel. Those skilled in the art will recognize that the operation of video scalers embedded in end user devices are idiosyncratic depending on manufacturer and may perform substantially below par, resulting in poor video quality and delayed performance. Advantageously, by converting to the native resolution of the video sink 106, video processing is minimized in downstream embedded video scalers.

In an embodiment of the invention, the output scaler 402 of the output board 310 is configured for operating in a pass through mode in which the output scaler detects the resolution of the incoming audiovisual data via the video timing data. The output scaler passes the incoming audiovisual data through to the HDCP transmitter if the audiovisual data is routed to the output board already at a native resolution of the video sink.

The output scaler 402 is further configured to generate audiovisual data comprising video timing data and image content data during switching discontinuities. For example, during a switching discontinuity between receiving audiovisual data from a first source 104a and audiovisual data from a second source 104b, the output scaler 402 may output black frames. By outputting a continuous stream of audiovisual data, more specifically video timing data, to the HDCP transmitter 215, the HDCP link between the output board 310 and the source is maintained as authenticated during the switch. In addition, by outputting black frames of audiovisual data, more specifically image content data, the end user experiences a clean transition from the first source 104a to the second source 104b. In other embodiments, the output scaler 402 may generate frames of image content data of a color other than black or may generate image content data comprising an image, such as a corporate logo.

Prior to outputting audiovisual data from the second source 104b, the output scaler 402 must receive a sufficient amount of audiovisual data from the second source 104b. This is known as achieving video lock. Following a switching discontinuity, the output scaler 402 is further configured to generate image content data until video lock is achieved. By generating image content data until the output scaler 402 achieves video lock, the user is presented with a clean transition during switching events.

The output scaler 402 is configured to operate in a free run mode by automatically generating video timing data during switching discontinuities.

The output scaler 402 is configured to generate image content data in response to control signals from the output processing unit 403. Upon receiving the user control signal to switch the source of audiovisual data and prior to transmitting a switching signal to the multiplexer 306, the switcher processing unit 318 transmits a prepare signal to the output processing unit 403. The output processing unit 403 in turn instructs the output scaler 402 to generate black frames of audiovisual data.

The HDCP transmitter 215, such as an HDMI transmitter, converts and encodes the audiovisual data output from the output scaler 402 to one or more TMDS signals for transmission to the video sink 106 over the HDCP interface. In an embodiment of the invention, the HDMI transmitter comprises an HDCP transmitter chip and may further comprise TMDS encoders or decoders and other HDMI-specific features. The audiovisual data is reencrypted in accordance with the shared secret from authentication between the HCDP repeater and the HDCP sink. The HDCP transmitter 215 receives the native resolution and the native refresh of the sink via a Display Data Channel (DDC) of the interface. The HDCP interface between transmitter and the HDCP receiver may be HDMI.

FIG. 5 shows the switcher device 302 in a video distribution network 300, according to a further embodiment of the invention in which the output board 310 is contained in a housing external to the switcher device 302. The video distribution network 300 comprises an extended transmission board 510 coupled between the multiplexer 306 and the output board 310. The video distribution network 300 further comprises an extended reception board 508. In an embodiment of the invention, the extended reception board 508 and extended transmission board 510 may be modular input and output boards, respectively, configured to be inserted into the switcher device 302. As described below, the extended transmission and reception boards allow for extended cable lengths which increases the functionality of the video distribution network 300. For example, the output board 310 may be collocated in the same area as its corresponding video sink 106. The switcher device 302 may be remotely located in a central location or out of view, such as in an equipment closet. Similarly, the first input board 308a and second input board 308b may be collocated with the first video source 104a and the second video source 104b, respectively.

In this embodiment, the output board 310 is configured for receiving encrypted audiovisual data via an HDCP link. The extended transmission board 510 is communicatively coupled between the multiplexer 306 and the output board 310 and is configured for encrypting the audiovisual data routed by the multiplexer 306 and transmitting the encrypted audiovisual data to the output board 310 via an HDCP link. The HDCP link comprises an HDCP transmitter 615 of the extended transmission board 510, an HDCP interface 502 and an HDCP receiver 401 of the output board 310. The HDCP interface 502 may be one or more pairs of twisted cable or fiber optical cable, such as DigitalMedia cable available from Crestron Electronics, Inc. of Rockleigh N.J. Those skilled in the art will recognize that DigitalMedia cable is a multi-generational family of interface cables particularly designed for media transmission for extended lengths.

Within a single plenum-rated jacket, original DigitalMedia cable contains one high-bandwidth/low-crosstalk shielded 4-twisted pair (STP) cable, one CAT5e unshielded 4-twisted pair (UTP) cable, and one DMNet cable. The STP "Audiovisual data" cable is of a specialized construction designed to allow the longest possible cable lengths for transporting high-definition digital video and audio. The Cat5e "Data Management" cable carries high-speed Ethernet and other data, plus 5V direct current (DC) power. Finally, the DMNet cable carries additional proprietary control signals and 24V DC power. Original DigitalMedia cable is rated for up to 220 ft of audiovisual transmission.

FIG. 6 is a block diagram of the extended transmission board and the output board shown in FIG. 5, according to an embodiment of the invention. The block diagram of the output board 310 is similar to the block diagram of the output board 310 in FIG. 4, with the exception being that in FIG. 5, the receiver 401 is an HDCP receiver configured for receiving HDCP content over an HDCP interface 502. The extended transmission board 510 comprises a receiver 601 and an HDCP transmitter 615.

FIG. 7 is a flowchart showing illustrative steps to perform a method for reducing the switching time in a video distribution network 300, according to an embodiment of the invention.

In step 701, a switcher device 302 receives audiovisual data at a first input board 308a via an HDCP link between a first video sink 106a and the first input board 308a.

In step 702, the switcher device 302 routes audiovisual data from the first input board 308a to an output board 310a.

In step 704, the output board 310 transmits audiovisual data to a video sink 106 over a security protocol link. In an embodiment of the invention, the output board 310 scales the audiovisual data received from the first input board 308a to the native resolution of the video sink 106 (step 703) prior to transmitting to the video sink 106.

In step 705, the processing unit 318 of the switcher device 302 receives a control signal to switch from routing audiovisual data from the first input board 308a to routing audiovisual data from the second input board 308b.

In an embodiment of the invention, the switcher device processing unit 318 transmits a prepare signal to the output board 310a, indicating that there will be a switching discontinuity (step 706).

In an embodiment of the invention, the output board 310a generates image content data, such as black frames of video, in response to receiving the prepare signal from the switcher device processing unit 318 (step 707). The scaler 402 outputs the generated image content data rather than the live image content data being routed to the output board 310a from the multiplexer 306.

In step 708, the multiplexer 306 ceases routing audiovisual data from the first input board 308a.

In step 709, the output board 310 continues generating video timing data at a native resolution during the delay between receiving audiovisual data from the first input board 308a and receiving audiovisual data from the second input board 308b. By outputting a continuous stream of video timing data, the output board 310a maintains the authenticity of the security link between the output board 310a and the video sink 106.

In step 710, the switcher device 302 receives audiovisual data at a second input board 308b via an HDCP link between a second video sink 106b and the second input board 308b.

In step 711, the switcher device 302 routes audiovisual data from the second input board 308b to the output board 310a.

In step 712, the output board continues generating and outputting image content data (i.e. black frames of video) until video lock is achieved.

In step 714, the output board 310a transmits live image content data routed from the second input board 308a to the video sink 106 over an HDCP link. In an embodiment of the invention, the output board 310a scales the audiovisual data received from the first input board 308a to the native resolution of the video sink 106 (step 713) prior to transmitting to the video sink 106.

The following is a pseudo-code representation of the operation in accordance with an illustrative embodiment of the present invention.

Detect a user control signal to switch from a first video source to a second video source Transmit a prepare signal to a processing unit of an output board in response to the detection of the user control signal Detect the prepare signal at the output board Instruct scaler to generate image content data Cease routing audiovisual data from a first video source to the output board Continue generating video timing data at the scaler of the output board Begin routing audiovisual data from a second video source to the input board Cease generating image content data upon achieving video lock In an embodiment of the invention, the video distribution system leverages a backdoor communication bus to prepare downstream devices, such as an output board 310 internal to the switcher device 302 or external to the switcher device 302, for a switching event.

Prior to a switching event, the switcher processing unit 318 transmits a prepare signal to downstream devices to prepare for a switching event. Each downstream device then relays the prepare signal to their downstream devices until the prepare signal is received at each necessary output board 310. For example, downstream devices may comprise additional switcher devices, output boards or intermediary relay devices and output boards 310 may comprise output boxes and output cards outputting audiovisual data to a video sink.

Output scalers 402 in the output boards 310 then "freeze" the current video in anticipation of the switch by ceasing transmission of scaled live audiovisual data to the sink and instead generate and output audiovisual data comprising a repeated frame of image content data. The repeated frame of image content data may be a frame of image content data received from the first audiovisual source prior to the switching event. By generating a repeated frame of image content data from the first audiovisual source, the video displayed on the video sink will appear to have momentarily frozen.

The switcher processing unit 318 directs the multiplexer 306 to perform the switching event subsequent to transmission of the prepare signal. The switcher processing unit 318 may direct the multiplexer 306 to perform the switch upon a predefined amount of time after transmitting the prepare signal or may direct the multiplexer 306 subsequent to confirming reception of the prepare signal.

The output scaler 402 generates and outputs the repeated frame of image content data until it has achieved video lock with the audiovisual data it receives subsequent to the switching event. By freezing and then unfreezing the video displayed on the video sink, the output scaler 402 achieves the look of an "instant switch" which is aesthetically pleasing to viewers and provides the perception of an instantaneous switch. In this embodiment, while the video system may distribute secure content, such as HDCP protected content, the content does not necessarily need be protected content.

FIG. 8 shows a block diagram of a portion of the switcher device, according to an illustrative embodiment of the invention. The multiplexer 306 transmits an audiovisual data signal from the first input board to a first output board 310a. The multiplexer 306 dynamically switches between the first input board and a second input board based on a user control signal that selects either the first video source or second video source to be displayed on the video sink.

The output board may be a card configured for being inserted into the switcher device or may be external to the switcher device. In an embodiment of the invention, there may be one or more intermediary devices between the multiplexer 306 and the output board such as additional switcher devices and relay devices as shown in the video distribution system of FIG. 10. The output board comprises a receiver, an output scaler 402, an output processing unit 403 and a transmitter 215. As discussed above, the transmitter 215 may be an HDCP transmitter. The receiver 401 is configured to receive audiovisual data routed from the first input board or second input board via the multiplexer 306. The receiver may be an HDCP receiver configured for receiving HDCP encrypted content.

The output scaler 402 receives the audiovisual data from the receiver and is configured to convert the received audiovisual data to a native resolution of the video sink. The output board may receive the native resolution of the video sink via an EDID channel. Those skilled in the art will recognize that the operation of video scalers embedded in end user devices are idiosyncratic depending on manufacturer and may perform substantially below par, resulting in poor video quality and delayed performance. Advantageously, by converting to the native resolution of the video sink, video processing is minimized in downstream embedded video scalers.

In an embodiment of the invention, the output scaler 402 of the output board 310 is configured for operating in a pass through mode in which the output scaler 402 detects the resolution of the incoming audiovisual data via the video timing data. The output scaler 402 passes the incoming audiovisual data through to the transmitter 215 if the audiovisual data is routed to the output board 310 already at a native resolution of the video sink.

The output scaler 402 is further configured to generate audiovisual data comprising video timing data and image content data prior to and during switching discontinuities. The output scaler 402 may further comprise a memory buffer and a frame buffer for generating and outputting a repeated frame of video to the video sink.

In this embodiment, prior to and during a switching discontinuity from a switching event, the output scaler 402 may output a repeated frame of image content data from the audiovisual data received from the first source. For example, upon receiving the prepare signal from the multiplexer 306, the output scaler 402 will "freeze" the video displayed on the video sink by generating and outputting a repeating frame of image content data from the audiovisual data received from the first source. The output scaler 402 is configured for continuing to generate and output audiovisual data comprising video timing data and the repeated frame of image content data while the switcher device ceases routing audiovisual data from the first video source and begins routing audiovisual data from the second video source.

The output scaler 402 must receive a sufficient amount of audiovisual data from the second source 104b prior to outputting live audiovisual data from the second source 104b. This is known as achieving video lock. Following a switching discontinuity, the output scaler 402 is further configured to generate the video timing data and repeated frame of image content data until video lock is achieved. Upon achieving video lock with the incoming video after the switching discontinuity, the output scaler 402 will then "unfreeze" the video by ceasing outputting the repeating frame and instead outputting the live scaled video. By repeating a frame of video, the user is presented a cleaner and more aesthetically pleasing switch consisting of a momentarily, and in some instances imperceptible, frozen screen.

In addition to the aesthetic advantages and perceived reduction in switching time by the user, the current invention reduces the switching time by maintaining scaler lock in any downstream scalars such as scalars embedded in video sinks. In HDCP systems switching time is further minimized. By outputting a continuous stream of audiovisual data, more specifically video timing data, to the HDCP transmitter 215, the HDCP link between the output board and the source is maintained as authenticated during the switch.

The output scaler 402 is configured to generate image content data in response to control signals from the output processing unit 403. The communication interface between the switcher processing unit 318 and the output processing unit 403 may be an Ethernet interface. In this embodiment, the prepare signal may be a user datagram protocol (UDP) packet transmitted over the Ethernet interface. However, the invention is not limited to UDP packets transmitted over Ethernet. In other embodiments of the invention, the interface may be a serial peripheral interface (SPI) or may be an HDMI interface transmitting the prepare signal as an infoframe packet.

Upon receiving the user control signal to initiate a switching event and prior to transmitting a switching signal to the multiplexer 306, the switcher processing unit 318 transmits a prepare signal to the output processing unit 403 via a communication interface. The output processing unit 403 in turn instructs the output scaler 402 to generate a repeated frame of audiovisual data.

In this embodiment, the switcher processing unit 318 may broadcast the prepare signal to each connected downstream device. Each downstream device may in turn process and broadcast the prepare signal to each of its connected downstream devices. As will be discussed below, in a further embodiment of the invention, the switcher processing unit 318 may transmit directly to each necessary output scaler 402. The prepare signal may comprise an address, such as a network address of an output card or output box.

The transmitter 215 is configured for converting and encoding the audiovisual data from the output scaler 402 for transmission to the video sink. In an embodiment of the invention, the transmitter 215 is an HDCP transmitter 215. The HDCP transmitter 215, such as an HDMI transmitter 215, converts and encodes the audiovisual data output from the output scaler 402 to one or more TDMS signals for transmission to the video sink over the HDCP interface. In an embodiment of the invention, the HDMI transmitter 215 comprises an HDCP transmitter 215 chip and may further comprise TMDS encoders or decoders and other HDMI-specific features. The audiovisual data is reencrypted in accordance with the shared secret from authentication between the HCDP repeater and the HDCP sink. The HDCP transmitter 215 receives the native resolution and the native refresh of the sink via a Display Data Channel (DDC) of the interface. The HDCP interface between transmitter 215 and the HDCP receiver may be HDMI.

FIG. 9 is a flowchart showing illustrative steps to perform a method for reducing the switching time in a video distribution network, according to an embodiment of the invention.

In step 901, a switcher device receives audiovisual data at a first input board via an AV link between a first video sink and the first input board.

In step 902, the switcher device routes audiovisual data from the first input board to an output board.

In step 904, the output board transmits audiovisual data to a video sink over an AV link. In an embodiment of the invention, the output board scales the audiovisual data received from the first input board to the native resolution of the video sink (step 903) prior to transmitting to the video sink.

In step 905, the processing unit 318 of the switcher device receives a control signal to switch from routing audiovisual data from the first input board to routing audiovisual data from the second input board.

In step 906, the switcher device processing unit 318 transmits a prepare signal to the output board, indicating that there will be a switching discontinuity.

In step 907, the output board generates image content data, such as a repeating frame of video, in response to receiving the prepare signal from the switcher device processing unit 318. The output scaler 402 outputs the generated image content data rather than the live image content data being routed to the output board from the multiplexer 306.

In step 908, the multiplexer 306 ceases routing audiovisual data from the first input board.

In step 909, the output board continues generating video timing data at a native resolution during the delay between receiving audiovisual data from the first input board and receiving audiovisual data from the second input board. By outputting a continuous stream of video timing data, the output board may maintain the authenticity of any security link between the output board and the video sink.

In step 910, the switcher device receives audiovisual data at a second input board via an AV link between a second video sink and the second input board.

In step 911, the switcher device routes audiovisual data from the second input board to the output board.

In step 912, the output board continues generating and outputting image content data (i.e. repeating frame of video) until video lock is achieved.

In step 914, the output board transmits live image content data routed from the second input board to the video sink over an AV link. In an embodiment of the invention, the output board scales the audiovisual data received from the first input board to the native resolution of the video sink (step 913) prior to transmitting to the video sink.

The following is a pseudo-code representation of the operation in accordance with an illustrative embodiment of the present invention.

Detect a user control signal to switch from a first video source to a second video source Transmit a prepare signal to a processing unit of an output board in response to the detection of the user control signal Detect the prepare signal at the output board Instruct output scaler to generate a repeated frame of image content data Cease routing audiovisual data from a first video source to the output board Continue generating video timing data at the output scaler of the output board Begin routing audiovisual data from a second video source to the input board Cease generating image content data upon achieving video lock In a further embodiment of the invention, the switcher device processing unit 318 is configured for determining the network topology of the video distribution network and transmitting an addressed prepare signal to each desired output device.

Certain video distribution networks, such as those employed on corporate campuses or educational institutions may comprise one or more switcher devices 302 connected in a complex topology. In addition to being coupled to one or more output boards 310 (i.e. output cards 310a, output boxes 310b), a switcher device 302 may be communicatively coupled with one or more switcher devices 302 to extend the reach and breadth of the video distribution network. In addition a single AV source may be routed to more than one AV sink. For example an AV source may be displayed in multiple conference rooms of a corporate facility. In this example, a switcher device may have to route audiovisual data from the multiplexer 306 to more than one output board 310.

FIG. 10 is a diagram of an illustrative video distribution network, in accordance with an embodiment of the invention. The video distribution network 1000 comprises a plurality of cascaded switcher devices 302. In this embodiment an output of a first switcher device 302a is coupled to an input of a second switcher device 302b and an output of the second switcher device 302b is coupled to an input of a third switcher device 302c.

Each successive device adds delay to the switching times during a switching event. Consider as an example, a video distribution network 1000 in which the first switcher device 302a receives audiovisual data at a first input card and routes to a video sink 106e via an output card coupled to a second switcher device 302b and third switcher device 302c and an output box 310e. In an embodiment in which the first switcher device processing unit 318 transmits a prepare signal to each of its endpoints (i.e. 310a, 510a . . . 510b), which then process and transmit to each of their endpoints until it reaches the desired endpoint, a noticeable delay will have been introduced to the switching process.

To reduce the delay caused by transmission of the prepare signal, in an embodiment of the invention, each switcher device is configured for determining and storing the topology of the video distribution network. The switcher devices may determine the topology upon being employed in the video distribution network, upon other devices joining or leaving the video distribution network, at periodic time intervals, or at any other time. The switcher device may determine the topology of the video distribution network via a network scanning tool or other similar technology.

Upon receiving the control signal to initiate a switching event and prior to transmitting a switch command to the multiplexer 306, the switching processing unit 318 transmits a prepare signal addressed to one or more desired endpoints. A desired endpoint is each endpoint comprising a scalar and transmitting audiovisual data to desired sinks. The endpoint may comprise an output board, such as an output card or an output box.

While the switcher processing unit 318 must still transmit via intermediary devices, the switcher processing unit 318 need not broadcast to all downstream devices. Advantageously, the prepare signal does not have to be processed at each intermediary node in the network which reduces latencies and reduces bandwidth.

FIG. 11 is a flowchart showing illustrative steps to perform a method for reducing the switching time in a video distribution network 300, according to an embodiment of the invention.

In step 1101, a switcher device 302 receives audiovisual data at a first input board via an AV link between a first video sink and the first input board.

In step 1102, the switcher device 302 routes audiovisual data from the first input board to an output board. The output board may be coupled via intermediate devices such as other switcher devices and output boards.

In step 1104, the output board transmits audiovisual data to a video sink over an AV link. In an embodiment of the invention, the output board scales the audiovisual data received from the first input board to the native resolution of the video sink (step 1103) prior to transmitting to the video sink.

In step 1105, the processing unit 318 of the switcher device 302 receives a control signal to switch from routing audiovisual data from the first input board to the output board to routing audiovisual data from the second input board to the output board.

In step 1106, the switcher device processing unit 318 determines the path to the output board including an output of the switcher device 302 and a network address of the output board from a stored network topology. Using the above example, in regard to FIG. 10, to first switcher device 302a may determine that the path to an endpoint comprises a third output board of the switcher device.

In step 1107, the switcher device processing unit 318 transmits a prepare signal comprising the network address of the output board to the output board, indicating that there will be a switching event. The switcher device transmits the addressed prepare signal to the appropriate downstream node according to the topology.

In step 1108, the output board generates image content data, such as a repeating frame of video, in response to receiving the prepare signal from the switcher device processing unit 318. Upon receiving the prepare signal, the output scaler 402 may freeze on a frame of video by continuously outputting that frame. The output scaler 402 outputs the generated image content data rather than the live image content data being routed to the output board from the multiplexer 306.

In step 1109, the multiplexer 306 ceases routing audiovisual data from the first input board.

In step 1110, the output board continues generating video timing data at a native resolution during the delay between receiving audiovisual data from the first input board and receiving audiovisual data from the second input board. By outputting a continuous stream of video timing data, the output board maintains the authenticity of the security link between the output board and the video sink.

In step 1111, the switcher device receives audiovisual data at a second input board via an AV link between a second video sink and the second input board.

In step 1112, the switcher device routes audiovisual data from the second input board to the output board.

In step 1113, the output board continues generating and outputting image content data (i.e. repeating frame of video) until video lock is achieved.

In step 1115, the output board transmits live image content data routed from the second input board to the video sink over an AV link. In an embodiment of the invention, the output board scales the audiovisual data received from the first input board to the native resolution of the video sink (step 1114) prior to transmitting to the video sink.

The following is a pseudo-code representation of the operation in accordance with an illustrative embodiment of the present invention.

Detect a user control signal to switch from a first video source to a second video source Determine network address of a desired output card Transmit a prepare signal comprising network address to a processing unit 403 of the desired output board in response to the detection of the user control signal Detect the prepare signal at the output board Instruct scaler to generate a repeated frame of image content data Cease routing audiovisual data from a first video source to the output board Continue generating video timing data at the scaler of the output board Begin routing audiovisual data from a second video source to the input board Cease generating image content data upon achieving video lock FIG. 12 shows a block diagram of the output scaler, according to an illustrative embodiment of the invention. The output scaler comprises a frame rate processing block 1202, a memory further comprising a frame buffer 1204, an input scaling block 1206 and an output scaling block 1208. In this embodiment, the term block is synonymous with circuit.

The scaler receives input audiovisual data 1201 from the receiver comprising video timing data and image content data. The frame rate processing block is configured for receiving the asynchronous input video timing data 1201 and writing the incoming image content data into memory 1204. The frame rate processing block 1202 is further configured for receiving the free-running output video timing data 1211 and reading incoming video data from memory 1204 as required by the output resolution of the scaler 402 (i.e. native resolution of the video sink). The frame rate processing block 1202 is further configured for performing frame rate conversion if the input refresh rate and the output refresh rate of the audiovisual data differ.

The input scaling block 1206 is configured for receiving the asynchronous input video timing data and performing scaling if required. In certain applications depending on the input and output setups, it is advantageous to perform input scaling before frame rate processing. In alternate applications it is advantageous to perform output scaling subsequent to frame rate processing. In these applications, the output scaling block 1208 receives the free running output video timing data and performs scaling if required.

The free running output timing generator 1210 is configured for continuously generating a free running output video timing data 1211 used to give the downstream video sink a fixed resolution.

In embodiments in which the output scaler 402 generates audiovisual data comprising a repeated frame of image content data, the last frame of video received by the output scaler 402 (i.e. the frame to be repeated) is repeatedly read from the memory and frame buffer and output by the output scaler 402. Upon the output scaler 402 achieving scaler lock with audiovisual data from the second source, a frame of image content data from audiovisual data received from the second source is read from the memory and frame buffer and output by the output scaler 402.

Any process descriptions or blocks in flow charts should be understood as representing modules, segments or portions of code that include one or more executable instructions for implementing specific logic functions or steps in the process. Alternate implementations are included within the scope of the preferred embodiment of the present invention in which functions may be executed out of order from that shown or discussed, including substantial concurrence or reverse order, depending on the functionality involved, as would be understood by those reasonably skilled in the art of the present invention. Also, steps disclosed as separate may be performed concurrently or combined, and a step shown as discrete may be performed as two or more steps.

Furthermore, numerical values and disclosures of specific hardware are illustrative rather than limiting. Moreover, while the preferred embodiment has been disclosed in the context of HDMI, the invention can be implemented for use with another suitable interface that uses HDCP, such as DVI or any substantially HDMI-like interface. Therefore, the present invention should be construed as limited by only the appended claims.

In this description, various functions and operations may be described as being performed by or caused by software code to simplify description. However, those skilled in the art will recognize what is meant by such expressions is that the functions result from execution of the code by a processor or processing unit, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While some embodiments can be implemented in fully functioning computers and computer systems, various embodiments are capable of being distributed as a computing product in a variety of forms and are capable of being applied regardless of the particular type of machine of computer-readable media used to actually effect the distribution.

At least some aspects disclosed can be embodied, at least in part, in software. That is, the techniques may be carried out in a computer system or other data processing system in response to its processor/processing unit, such as a microprocessor, executing sequences of instructions contained in a memory, such as ROM, volatile RAM, non-volatile memory, cache or a remote storage device.

Routines executed to implement the embodiments may be implemented as part of an operating system, middleware, service delivery platform, SDK (Software Development Kit) component, web services, or other specific application, component, program, object, module or sequence of instructions referred to as "computer programs". Invocation interfaces to these routines can be exposed to a software development community as an API (Application Programming Interface). The computer programs typically comprise one or more instructions set at various times in various memory and storage devices in a computer, and that, when read and executed by one or more processors/processing units in a computer, cause the computer to perform operations necessary to execute elements involving the various aspects.

A machine readable medium can be used to store software and data which when executed by a data processing system causes the system to perform various methods. The executable software and data may be stored in various places, including for example ROM, volatile RAM, non-volatile memory and/or cache. Portions of this software and/or data may be stored in any of these storage devices. Further, the data and instructions can be obtained from centralized servers or peer to peer networks. Different portions of the data and instructions can be obtained from different centralized servers and/or peer-to-peer networks. Different portions of the data and instructions can be obtained from different communication sessions or in a same communication session. The data and instructions can be obtained in their entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include, but are not limited to, recordable and non-recordable type media, such as volatile and non-volatile memory devices, read-only memory (ROM), random access memory (RAM), flash memory devices, floppy and other removable disks, magnetic disk storage media, optical storage media (e.g. Compact Disc Read-Only Memory (CD ROM), Digital Versatile Discs (DVDs), etc.) among others. The instructions may be embodied in digital and analog communication links for electrical, optical, acoustical or other forms of propagated signals, such as carrier waves, infrared signals, digital signals, etc.

In general, a machine readable medium includes any mechanism that provides (i.e. stores and/or transmits) information in a form accessible by a machine (e.g. a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination or hardware circuitry and software nor to any particular source for the instructions executed by the data processing system.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

Although illustrative embodiments of the present invention have been described herein with reference to the accompanying drawings, it is to be understood that the invention is not limited to those precise embodiments, and that various other changes and modifications may be made therein by one skilled in the art without departing from the scope of the appended claims.

INDUSTRIAL APPLICABILITY

To solve the aforementioned problems, the present invention is a unique device in which an output board with a output scaler 402 minimizes switching delay in a video distribution network by outputting a continuous stream of audiovisual data during switching events.

LIST OF ACRONYMS USED IN THE DETAILED DESCRIPTION OF THE INVENTION

The following is a list of the acronyms used in the specification in alphabetical order.
AV audiovisual
CAT5e category 5 enhanced
DC direct current
DCP Digital Content Protection, LLC
DDC Display Data Channel
DM DigitalMedia
DRM digital rights management
DVD digital video disc
DVR digital video recorder
EDID extended display data channel
HDCP high-definition
HDMI high definition multimedia interface
PCB printed circuit board
STP shielded twisted pair
TMDS transition minimized differential signaling
UTP unshielded twisted pair Alternate Embodiments Alternate embodiments may be devised without departing from the spirit or the scope of the invention. For example, during switching events, the output scaler may generate video information such that a switching graphic will be displayed on the screen or a color other than black.

What is claimed is:

1. A switcher device comprising:
   (a) at least two input boards, each of the at least two input boards configured for receiving audiovisual data from an audiovisual source via an audiovisual link;
   (b) a multiplexer communicatively coupled between the at least two input boards and an output board and configured for dynamically routing audiovisual data from the at least two input boards to the output board; and wherein
   the output board is configured for
      (i) transmitting audiovisual data to an audiovisual sink via an audiovisual link,
      (ii) generating audiovisual data comprising a repeated frame of image content data, and
      (iii) outputting a continuous stream of audiovisual data during a switching event, the audiovisual data comprising the repeated frame of image content data, and wherein
   the output board further comprises a scaler configured for generating the repeated frame of image content data during the switching event, and wherein
   the output board is configured for transmitting audiovisual data to the audiovisual sink via a security protocol link and is further configured for maintaining the security protocol link as an authenticated interface by generating a continuous stream of video timing data during the switching event, and wherein
   the switcher device comprises a switcher device processing unit and the output board comprises an output board processing unit, and wherein
      (a) the switcher device processing unit is communicatively coupled with the multiplexer and the output board processing unit, and
      (b) the switcher device processing unit transmits a prepare signal to the output board processing unit a predetermined amount of time before transmitting a switch signal to the multiplexer.

2. The switcher device of claim 1 wherein the switching event is a switch from receiving audiovisual data from a first audiovisual source to receiving audiovisual data from a second audiovisual source.

3. The switcher device of claim 1 wherein the switching event is a switch from receiving audiovisual data at a first resolution to receiving audiovisual data at a second resolution.

4. The switcher device of claim 1 wherein the switching event is a switch from receiving audiovisual data at a first refresh rate to receiving audiovisual data at a second refresh rate.

5. The switcher device of claim 1 wherein the scaler is configured for continuing to output the repeated frame of image content data until receiving a sufficient amount of audiovisual data after the switching event to achieve video lock.

6. The switcher device of claim 5 wherein the scaler is configured for determining the native resolution of the video sink from Extended Display Identification Data (EDID) information of the audiovisual sink.

7. The switcher device of claim 1 wherein the security protocol link is a High-bandwidth Digital Content Protection link.

8. The switcher device of claim 1 further comprising a scaler configured for generating the continuous stream of video timing data at a native resolution of the audiovisual sink.

9. A video distribution network comprising:
(a) a switcher configured for dynamically routing audiovisual data from at least two audiovisual sources to an output device and transmitting a prepare signal to the output device prior to a switching event, wherein the prepare signal comprises a network address of the output device; and
(b) a multiplexer, and wherein
the output device is communicatively coupled to the switcher and configured for
  (i) transmitting audiovisual data to an audiovisual sink via an audiovisual link,
  (ii) receiving the prepare signal from the switcher,
  (iii) generating audiovisual data comprising a repeated frame of image content data in response to the prepare signal, and
  (iv) outputting a continuous stream of audiovisual data during the switching event, the audiovisual data comprising the repeated frame of image content data, and wherein
the output device comprises a scaler configured for generating the repeated frame of image content data during the switching event, and wherein
the output device is further configured for transmitting audiovisual data to the audiovisual sink via a security protocol link and is further configured for maintaining the security protocol link as an authenticated interface by generating a continuous stream of video timing data during the switching event, and wherein
the switcher comprises a switcher device processing unit and the output device comprises an output device processing unit and wherein:
  (a) the switcher device processing unit is communicatively coupled with the multiplexer and the output device processing unit, and
  (b) the switcher device processing unit transmits a prepare signal to the output device processing unit a predetermined amount of time before transmitting a switch signal to the multiplexer.

10. The switcher device of claim 9 wherein the switcher device processing unit and the output device processing unit are communicatively coupled via an Ethernet interface.

11. The switcher device of claim 10 wherein the prepare signal is transmitted as a user datagram protocol packet.

12. The video distribution network of claim 9 wherein the switcher is further configured for determining a network topology of the video distribution network.

13. An output board for a switcher device configured for transmitting audiovisual data to a video sink, the output board comprising:
a scaler configured for generating video timing data at a native resolution of the video sink and a repeated frame of image content data during a switching event, wherein
the switching event is a switch from receiving audiovisual data from a first source to receiving audiovisual data from a second source, and wherein
the scaler is further configured for generating the repeated frame of image content data during the switching event, and wherein
the output board is further configured for transmitting audiovisual data to the video sink via a security protocol link and is further configured for maintaining the security protocol link as an authenticated interface by generating a continuous stream of video timing data during the switching event, and wherein
the switcher device comprises a switcher device processing unit and the output board further comprises an output board processing unit, and wherein
  (a) the switcher device processing unit is communicatively coupled with the multiplexer and the output board processing unit, and
  (b) the switcher device processing unit transmits a prepare signal to the output board processing unit a predetermined amount of time before transmitting a switch signal to the multiplexer.

14. The output board of claim 13 wherein the switching event is a switch from receiving audiovisual data at a first resolution to receiving audiovisual data at a second resolution.

15. The output board of claim 13 wherein the switching event is a switch from receiving audiovisual data at a first refresh rate to receiving audiovisual data at a second refresh rate.

16. The output board of claim 13 wherein the scaler is configured for continuing to output the repeated frame of image content data until receiving a sufficient amount of audiovisual data after the switching event to achieve video lock.

17. The output board of claim 13 wherein the scaler determines a native resolution of the video sink from Extended Display Identification Data (EDID) information of the video sink.

18. A method for reducing switching audiovisual sources in a video distribution network, the method comprising the steps of:
(a) routing audiovisual data from a first audiovisual source to an output device;
(b) transmitting audiovisual data from the output device to an audiovisual sink;
(c) receiving a control signal to switch from routing audiovisual data from the first audiovisual source to routing audiovisual data from a second audiovisual source;
(d) transmitting a prepare signal to the output device prior to switching from the first audiovisual source to the second audiovisual source;
(e) in response to the prepare signal, generating audiovisual data at the output device comprising a repeated frame of image content data during the delay between receiving audiovisual data from the first audiovisual source and receiving audiovisual data from the second input board; and
(f) routing audiovisual data from the second audiovisual source to the output device, and wherein the output device further comprises a scaler configured for generating the repeated frame of image content data during the switching event, and wherein the output device is configured for transmitting audiovisual data to the audiovisual sink via a security protocol link and is further configured for maintaining the security protocol link as an authenticated interface by generating a continuous stream of video timing data during the switching event, and wherein the video distribution network comprises a multiplexer and a switcher device processing unit, and wherein the output device comprises an output board processing unit, and wherein
- (a) the switcher device processing unit is communicatively coupled with the multiplexer and the output device processing unit, and
- (b) the switcher device processing unit transmits a prepare signal to the output device processing unit a predetermined amount of time before transmitting a switch signal to the multiplexer.

19. The method of claim 18 further comprising the steps of:
- (g) scaling audiovisual data at the output device to a native resolution of the display.

20. The method of claim 18 further comprising the step of:
- (h) continuing to generate audiovisual data at the output device until an amount of audiovisual data sufficient to achieve video lock is received from the second audiovisual source.

21. The method of claim 18 wherein the prepare signal further comprises a network address of the output device.

22. The method of claim 21 further comprising the step of determining a video distribution network topology.

23. The method of claim 22 further comprising the step of determining a network path to the output device.

24. A switcher device comprising:
- (a) at least two input boards, each of the at least two input boards adapted to receive audiovisual data from an audiovisual source via an audiovisual linker);
- (b) one or more output boards, each of the one or more output boards comprising
  - a receiver adapted to receive audiovisual data,
  - a scaler that includes an input connected to an output of the receiver,
  - an output board processor unit, and
  - an output board transmitter including an input that is connected to an output of the scaler and adapted to transmit scaled encrypted audiovisual data output from the scaler; and
- (c) a multiplexer communicatively coupled between the at least two input boards and the output board, and wherein the multiplexer is adapted to dynamically route audiovisual data from the at least two input boards to a first of the one or more output boards, the multiplexer including a switcher device processing unit, and wherein each of the one or more output boards is adapted to
- (i) transmit audiovisual data to an audiovisual sink via an audiovisual link,
- (ii) generate audiovisual data comprising a repeated frame of image content data by the scaler during the switching event, and
- (iii) output a continuous stream of audiovisual data during a switching event, the audiovisual data comprising the repeated frame of image content data, and further wherein
  - the switcher device processing unit is communicatively coupled with the multiplexer and the output board processing unit, and
  - the switcher device processing unit is adapted to generate and transmit a prepare signal to the output board processing unit a first predetermined amount of time before transmitting a switch signal to the multiplexer, and a second predetermined amount of time after receiving a user control signal to switch between two audiovisual sources.

* * * * *